United States Patent
Burge et al.

(10) Patent No.: US 10,592,560 B2
(45) Date of Patent: *Mar. 17, 2020

(54) KNOWLEDGE OBJECT AND COLLABORATION MANAGEMENT SYSTEM

(71) Applicant: Pandexio, Inc., Hermosa Beach, CA (US)

(72) Inventors: John Richard Burge, Manhattan Beach, CA (US); Ryan Nance, Hermosa Beach, CA (US)

(73) Assignee: PANDEXIO, INC., Hermosa Beach, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/704,780

(22) Filed: Sep. 14, 2017

(65) Prior Publication Data

US 2018/0024999 A1    Jan. 25, 2018

Related U.S. Application Data

(63) Continuation of application No. 14/527,602, filed on Oct. 29, 2014, now Pat. No. 9,773,000.

(Continued)

(51) Int. Cl.
  *G06F 16/93* (2019.01)
  *H04L 29/06* (2006.01)
  *G06F 16/242* (2019.01)

(52) U.S. Cl.
  CPC .......... *G06F 16/93* (2019.01); *G06F 16/242* (2019.01); *H04L 65/403* (2013.01)

(58) Field of Classification Search
  None
  See application file for complete search history.

(56) References Cited

U.S. PATENT DOCUMENTS 5,577,188 A    11/1996   Zhu
5,659,729 A     8/1997   Nielsen
(Continued)

FOREIGN PATENT DOCUMENTS

WO    2007/015184 A2    2/2007
WO    2009/006070 A2    1/2009
(Continued)

OTHER PUBLICATIONS

Benderky, M. et al., "Quality-Biased Ranking of Web Documents", WSDM, Feb. 9-12, 2011.

(Continued)

*Primary Examiner* — Richard L Bowen
(74) *Attorney, Agent, or Firm* — Fish IP Law, LLP

(57) ABSTRACT

The inventive subject matter provides apparatus, systems and methods in which a point management system packages worker thought-processes and supporting reference materials with the point or conclusion being made, enabling rapid review and verification by a decision-maker. The point management system includes a literal object database, snip object database and point object database, wherein each snip object is derived from a literal object and linked to the location from which it was derived. The system further includes a point authoring module that enables users to link snip objects within the point object, and a snip verification engine that enables a reviewer of the point object to verify the supporting snip objects and literal objects, their relationships to each other and to the points being made in the point object, and the team collaboration that has transpired at both the snip object level and point object level.

9 Claims, 20 Drawing Sheets

Related U.S. Application Data

(60) Provisional application No. 61/897,142, filed on Oct. 29, 2013.

(56) References Cited

U.S. PATENT DOCUMENTS

| | | | |
|---|---|---|---|
| 6,877,137 | B1 | 4/2005 | Rivette et al. |
| 6,973,616 | B1 | 12/2005 | Cottrille et al. |
| 7,243,301 | B2 | 7/2007 | Bargeron et al. |
| 7,512,985 | B1 | 3/2009 | Grabamik et al. |
| 7,594,258 | B2 | 9/2009 | Mao et al. |
| 7,899,843 | B2 | 3/2011 | Dettinger et al. |
| 7,987,416 | B2 | 7/2011 | Loeser et al. |
| 8,074,165 | B2 | 12/2011 | Baldonado et al. |
| 8,103,705 | B2 | 1/2012 | Chitrapura et al. |
| 8,165,974 | B2 | 4/2012 | Privault et al. |
| 8,166,028 | B1 | 4/2012 | Reynar et al. |
| 8,214,734 | B2 | 7/2012 | Grabamik et al. |
| 9,773,000 | B2 * | 9/2017 | Burge ............... G06F 16/93 |
| 2002/0089533 | A1 | 7/2002 | Hollaar et al. |
| 2005/0149576 | A1 | 7/2005 | Marmaros et al. |
| 2005/0256866 | A1 | 11/2005 | Lu et al. |
| 2006/0048047 | A1 | 3/2006 | Tao |
| 2006/0287971 | A1 | 12/2006 | Armstrong |
| 2008/0263067 | A1 | 10/2008 | Diederiks et al. |
| 2009/0132907 | A1 | 5/2009 | Shao et al. |
| 2009/0260060 | A1 | 10/2009 | Smith et al. |
| 2011/0243373 | A1 | 10/2011 | Li |
| 2011/0246514 | A1 | 10/2011 | Bartholomew |
| 2011/0265034 | A1 | 10/2011 | Garin et al. |
| 2012/0191716 | A1 | 7/2012 | Omoigui |
| 2012/0233154 | A1 | 9/2012 | Walther et al. |
| 2012/0297182 | A1 | 11/2012 | Hawkins |
| 2012/0317468 | A1 | 12/2012 | Duquene et al. |

FOREIGN PATENT DOCUMENTS

| | | |
|---|---|---|
| WO | 2011/075295 A1 | 6/2011 |
| WO | 2012/040621 A2 | 3/2012 |

OTHER PUBLICATIONS

IBM, "Annotation Concepts", IBM File Net P8 Documentation > Developer Help > Content Engine Development > Java and NET Developer's Guide > Annotations, http://pic.dhe.ibm.com/infocenter/p8docs/v4r5m1/index.jsp?topic=%2Fcom.ibm.p8.doc%2Fdeveloper_help%2Fcontent_engine_api%2Fguide%2Fgs_concepts.htm.

McGee, M., "Google Search Quality Raters Instructions Gain New "Page Quality" Guidelines", Search Engine Land, Sep. 7, 2012, http://searchengineland.com/google-search-quality-raters-instructions-gain-new-page-quality-guidelines-132436.

Oracle, "5.3 Working with Annotations", Oracle Fusion Middleware User's Guide for Imaging and Process Management, 2010.

Shaw, A. "Explore Source: A New Feature to "Show Our Work"", The PropPublica Nerd Blog, Dec. 15, 2011, www.propublica.org/nerds/item/explore-sources-a-new-feature-to-show-our-work.

* cited by examiner

Http://www.mydomain.com/pointobject 35626abc.html

Team Point-Snip Collaboration 45

Team Snip-Literal Collaboration 25

Point Layer 60

Point-Snip Verification Link 50

Snip Layer 40

Snip-Literal Verification Link 30

Literal Layer 20

User Point-Snip Assertions 55

User Snip-Literal Assertions 35

KNOWLEDGE OBJECT AND COLLABORATION MANAGEMENT SYSTEM

This application claims the benefit of co-pending U.S. non-provisional application Ser. No. 14/527,602, which claims the benefit of U.S. provisional application No. 61/897,142, entitled "Knowledge Object and Collaboration Management System", filed on Oct. 29, 2013. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is knowledge sharing and collaboration management system.

BACKGROUND

The background description includes information that may be useful in understanding the present invention. It is not an admission that any of the information provided herein is prior art or relevant to the presently claimed invention, or that any publication specifically or implicitly referenced is prior art.

As industrialized nations increasingly shift from industry-based economies to knowledge-based economies, knowledge must be created and transferred across workers faster and more efficiently than ever before. In order to compete, today's knowledge organization increasingly needs its workers to read more, learn faster and more easily share the resulting knowledge with co-workers. Some of the specific processes in need of acceleration include:

Assimilating learned information acquired from reading multiple pieces of content;
Synthesizing the assimilated learned information into higher-levels of knowledge (aggregated knowledge), including findings, conclusions and recommendations;
Presenting the knowledge to others in an efficient, yet verifiable manner
Validating and verifying knowledge for efficient evidence-based decision-making Historically, electronic information has been synthesized into reports using tools like Microsoft Word® or Google Docs®, or into slide presentations using tools like Microsoft PowerPoint®. These tools, and the information formats they generate, are limited in that they primarily output information in a one-dimensional form. To the extent supporting content or references that have been reviewed by a knowledge worker are associated into the output, they are by way of cross-references or hyperlinks to other, unrelated systems, and are not incorporated into the information format itself.

For example, reports and presentations may contain references to supporting content or evidence contained within secondary sources, however they do not incorporate those references and secondary sources as additional layers of information within the report or presentation format. As a result, it is very time-consuming, and sometimes not possible, for the reader of the cross-reference to access the cross-referenced information. The reader of the cross-reference has to execute several processes to acquire the cross-referenced information. They have to read footnotes or endnotes, use that information to search for the source documents, acquire the source documents and navigate to the appropriate location within the source documents. Where a cross-reference starts and ends is often not clear from the cross-reference, which does not incorporate a precise way of locating referenced information within a source document.

Reports and presentations may also contain hyperlinks to secondary sources stored on the WWW or an internal file system. While this provides a means of potentially verifying a source, and finding an excerpt within a source, this process has several drawbacks with respect to performing knowledge work:

It is generally a manual process that requires the user to go outside the system where the excerpt is stored to navigate to where the source document or web page is stored;
It relies on a source website remaining at the same Internet address that was captured at the time of excerpt capture;
It relies on the content having remained unchanged since the time the excerpt was captured;
It requires the user to manually scan the content of the source in order to find the specific location of the excerpt within that source;
It requires the application of judgment that the user has in fact accurately matched up the excerpt with the location within the body of the source;
For anyone whom the user seeks to share the excerpt with, they have to go through a similar process.

This can be quite problematic and frustrating, particularly for knowledge workers who seek to curate their excerpts and related sources as part of their knowledge base. Or, for those who seek to provide a deliverable to others based on referenceable, verifiable excerpts of content as is typical in research, academic and other settings where citation systems are commonly used for this purpose. It is quite frustrating and time-consuming to read-read an entire document every time one wants to verify the source and context of an excerpt. And web pages are dynamic entities. Their content frequently changes, their location frequently changes.

Furthermore, as social technologies increase in use and prevalence, there is a need for communicating this type of information via activity streams or other HTML-based communication mechanisms commonly found in web-based systems.

Accordingly, there is a need for a fundamentally new way for knowledge workers to package their points and conclusions with the underlying content and sources which were reviewed and analyzed in the process of creating them, such that a recipient of the points and conclusions can quickly and efficiently verify them against the underlying content and sources.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods in which a point management system packages worker thought-processes and supporting reference materials with the point or conclusion being made, enabling rapid review and verification by a decision-maker.

In the preferred embodiment, point objects incorporate a multi-level data structure that may consist of other point objects, snip objects which include excerpts of documents, segments of audio or video files, or other forms of literal objects along with any metadata added by the snip creator or other viewers, as well as the documents (or other form of literal objects) from which said snips were captured. Point objects represent work-product created by the point author, and can include, but not limited to, the author's conclusions, points, thoughts, ideas, findings and organizational structures related to snip objects processed by the point author. The point objects may be represented as a bulleted or numbered list, a hierarchical point structure (e.g. outline) or narrative paragraph(s) of text. The snip objects may include any snip objects to which the point author has access, including those created by the point author or others. The snip objects are associated with the literal objects from which they were captured, enabling the point author, and anyone provided access to the point object, to navigate to viewing the snip objects, including at the precise location within the literal objects from where they were derived so the reviewer of a point object can see the full context of all the snip objects that have been embedded inside the point object.

Basic Data Structure:
Level 1: Point objects (one or more levels)
    |
Level 2: Snip objects
    |
Level 3: Literal objects (source content from where snip objects were captured)

Publishers of point objects can share the point objects in web pages and documents by inserting a URL associated with the published point object into the web pages or documents. When viewing a published snip object, snip objects that are associated with the point object are visually identified such that the viewer can open/expand the snip object to view its contents. Here this mechanism is shown as a buttonized-word that, when clicked, expands the point object to reveal the contents of the snip object. Snip objects further contain a means for the viewer to access the underlying source document (or other literal object) as their permissions provide, which may include, but not be limited to, a hyperlink to that source document. Users with access to the point object may make comments on the point object, which are separate and distinct from comments placed on snip objects. This creates a two-level commenting system, wherein snip comments represent comments on the snip object itself, and point-level comments represents comments on the point object and/or how that point object relates to snip objects associated with it (e.g. how well they provide support for the point, or relate to the point being made). Comments are shown in this application at the bottom of the point object. In other embodiments, comments on point objects may be at the paragraph or bullet level within a point object.

Snip objects may be created from documents, web pages, videos, audio files or other content stored within the literal database. A user may incorporate snip objects into a point object and then create points based on those snip objects (bottoms-up point-maker), or create their points first and then add snips to a point object (top-down point-maker). Snip objects may be associated with point objects using any method known to those skilled in the art, including but not limited to drag-and-drop of snip objects, typing the "@" or other symbol within a point-object field to trigger a query of a snip object database. The visual association between snip objects and point objects may be depicted using any method known to those skilled in the art, including but not limited to showing part of the snip object under the point object. Other embodiments can be appreciated, such as displaying snip objects and point objects in adjacent columns and drawing splines between point objects and associated snip objects, rotating snips into the viewport for display next to point objects when point objects are selected by the user. Point objects may be displayed to users as a list of titles in a collapsed form, which can be expanded upon user activation to display all points and associated snip objects for that point object.

The point management system comprises a literal object database, configured to store literal objects (e.g. document, web page, image, video file) and a snip object database configured to store a plurality of snip objects, each snip object including an excerpt of, or pointer to, digital content from a literal object stored in the literal database, at least one piece of snip metadata input by a user and a snip location corresponding with the location of the excerpt of digital content within the literal object.

A point authoring module is coupled with the snip database and configured to provide a user interface enabling a user to generate a set of points and embed snip objects within that set of points. A snip search engine generates a query in real-time based on key words input by the user, submits the query to the snip database and receives a result set of snip objects from the snip database that satisfy the query. In some embodiments, the user may simply drag and drop a snip object to include it in a point. The point authoring module is configured to instantiate a point object based on the set of snips, link zero or more of those snip objects with the point object as part of the point content, and configure a device to store the point object.

In some embodiments the point authoring module is coupled with the snip database and configured to provide a user interface configured to allow a user to generate a set of points, instantiate a point object based on the set of snips, load snip objects into the point object according to indicators specified by a user, re-order the snip objects pursuant to user instructions, link the loaded snip objects within the point object and configure a device to store the point object.

A snip verification engine is coupled with the snip database and the literal database. It is configured to detect an interaction with the snip object within a literal object and instantiate a mechanism to display the literal object associated with the snip object by looking up the literal object within the literal database. The mechanism to display a literal object includes at least one snip location and at least one piece of snip metadata, and the snip verification engine is configured to exhibit the snip within the literal object according to the literal display mechanism.

In some embodiments, the point metadata can be classified as a fact, a point, a conclusion and a synthesis. The literal object can be a document, with the snip location comprising a set of coordinates which identify a section of that document. The point management system can include a snipping module that enables users to create snip objects and store them in the snip object database. In other embodiments, access rights to the point objects, snip objects and literal objects can be governed according to rights policies specific to each of the objects. User access to snip objects can be governed by the rights policy data for the literal objects referenced by the snip objects. The point management system can also include a metadata management system configured to resolve differences between the rights policies of point objects, snip objects and literal objects. In other embodiments, snip objects returned from a query of the snip object database by the snip search engine can include snip objects created by users other than the author of the point object. In another embodiment, the point management system can further generate a point card widget configured for insertion within a web page, such as an activity stream or blog.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1b illustrates an example data structure of the inventive subject matter.

FIG. 6b illustrates a user interface of some embodiments for querying a snip database.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that the above-described invention relates to a computing system connected to a network. The computing system may include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packetswitched network, the Internet, LAN, WAN, VPN, or other type of packet switched network. The computing and network systems which support this invention are more fully described in the patent applications referenced within this application.

Figure 1A:
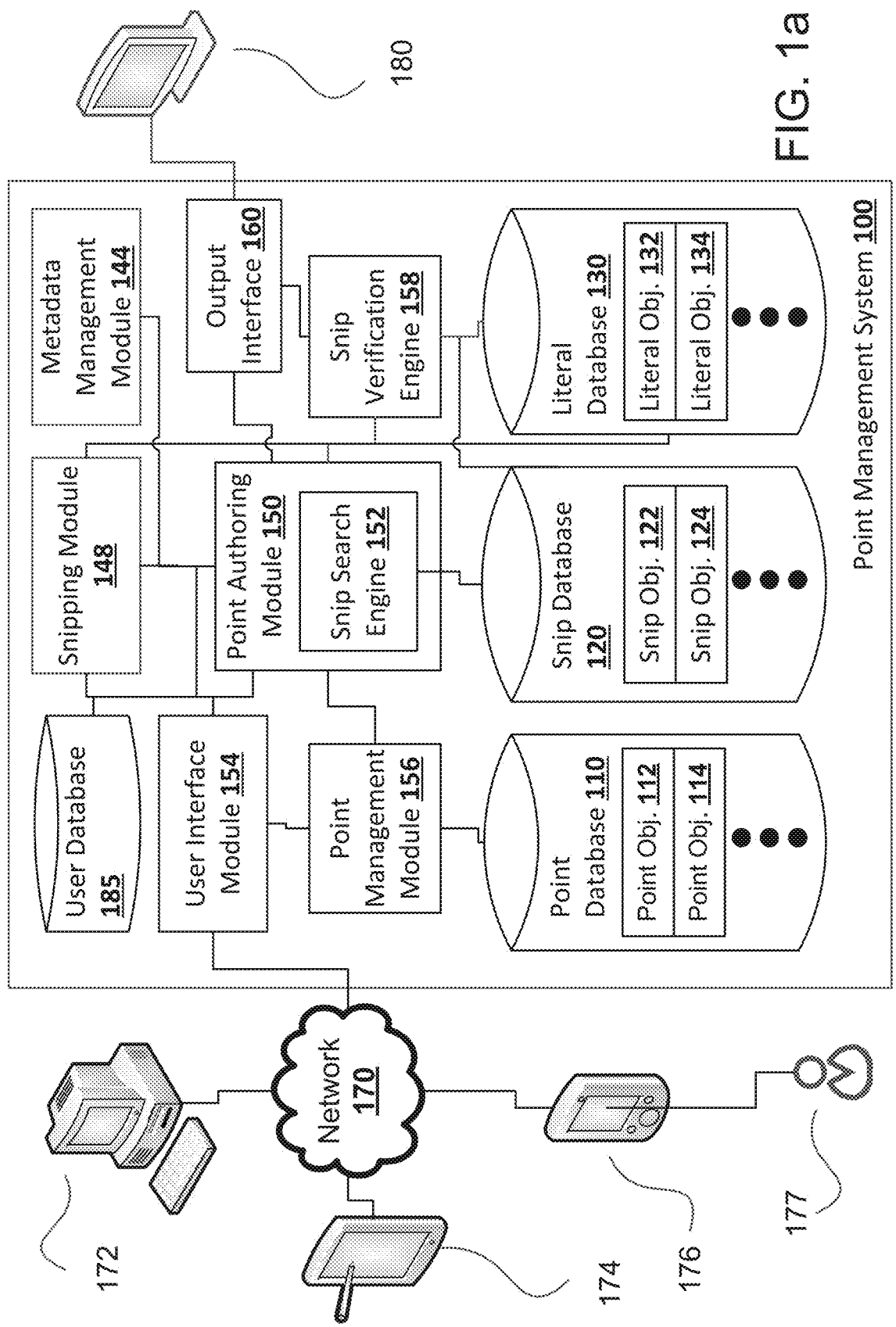
FIG. 1a is a schematic of a point management system capable of generating and managing point objects.

FIG. 1a illustrates point management system 100 of some embodiments, here shown as comprising three databases: a point database 110 for storing point objects, a snip database 120 for storing snip objects and a literal database 130 for storing literal objects.

Figure 6A:
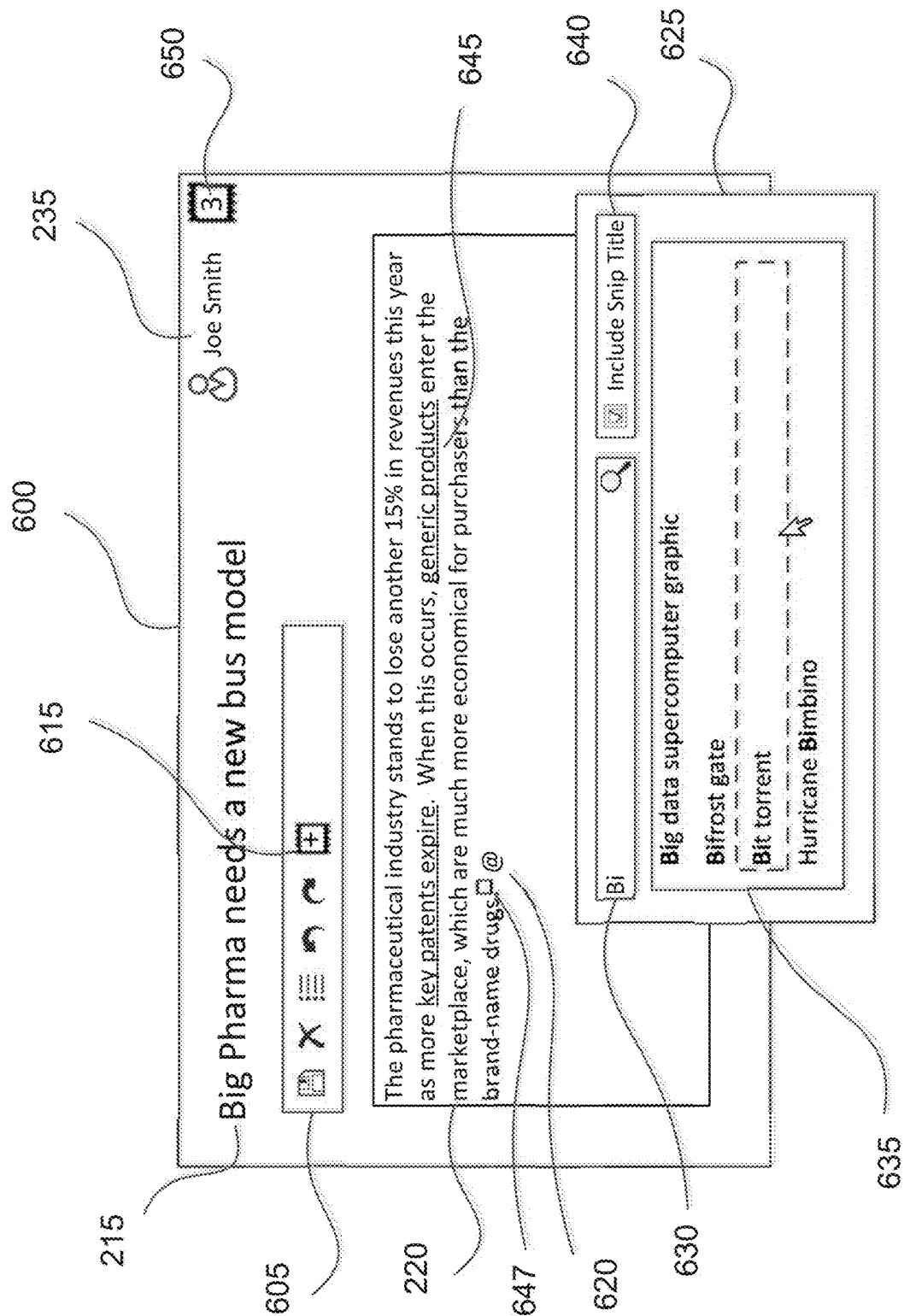
FIG. 6a illustrates a user interface of some embodiments for creating a point object.
Figure 7A:
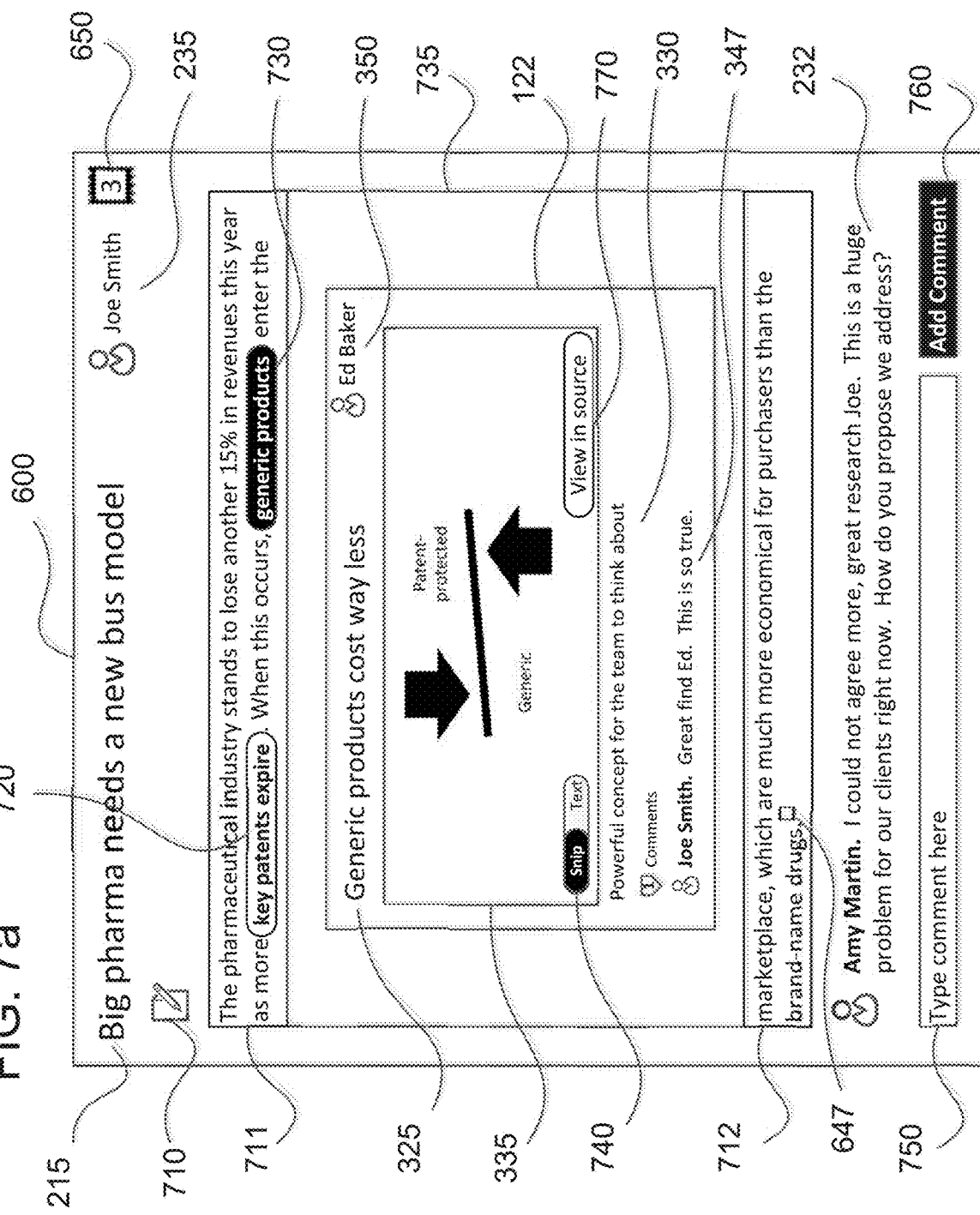
FIGS. 7a-7c illustrates a user interface of some embodiments for presenting a point object.

As shown in FIG. 6a and FIG. 7a, point objects represent digital work-product created by a point author, and can include, but not limited to, the author's conclusions, points, thoughts, ideas, findings and organizational structures related to snip objects processed by the point author. Point objects are digital documents and may include bulleted or numbered lists, a hierarchical structure (e.g. outline), narrative paragraph(s) of text, linked or embedded pictures, video files, audio files or other document files. Point objects may further include one or more snip objects referenced within the point object.

Figure 6B:
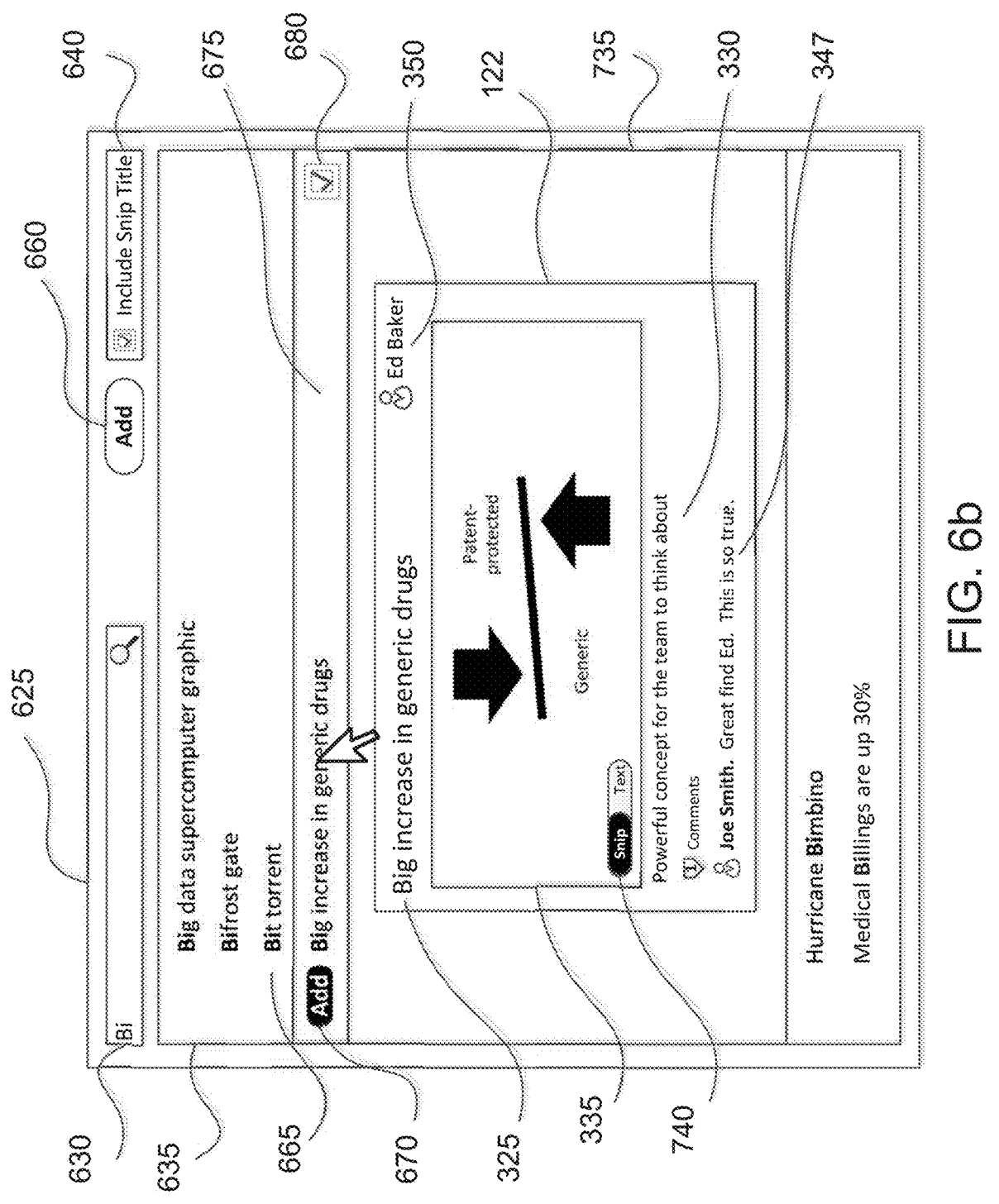

As shown in FIGS. 3, 6a, 6b and 7a, snip objects comprise an excerpt of content that has been selected from a literal object by a user. Literal objects comprise a form of digital content, and may include a digital document, web page, e-Book, blog, picture, video, audio or other form of digital content known in the art. In FIGS. 6a, 6b and 7a, the literal object is shown as a document, with the snip object including image of the selected content, and information that has been inserted by a user as metadata to be associated with the snip object. In some embodiments, the snip object is a separate entity from the literal object from which the associated excerpt of content has been selected. Thus the viewing and modifying of the snip object (and associated content) has no effect on the literal object from which the content was selected. In some embodiments, the snip object is a two-layer object that includes both the image of the content selected from the literal, as well as text from the literal that is associated with the image, derived from the image via character recognition technologies such as OCR or captured as part of the user content selection process based on the features offered by the software used to view the literal at the time the snip object was selected. Additional embodiments of snip objects, their associations and interactions, and examples of how they are created are described in co-owned U.S. patent application 61/722,033 entitled "Collaboration Management Systems", filed Nov. 2, 2012 wherein they are referred to as collaboration objects, and in co-owned U.S. patent application 61/788,106 entitled "Website Excerpt Validation and Management System", filed Mar. 15, 2013, wherein they are referred to as document clip objects. Additionally, snip objects may be created using a snipping module interfaced with a reading application, as described in co-owned U.S. patent application 61/968,505 entitled "System and Method for Transmitting Organizational Knowledge To and From Reading Applications", filed Mar. 21, 2014.

In some embodiments, snip objects can further comprise assertion objects, representing a relationship between an assertion and an information source, as described in co-owned U.S. patent application 61/755,839 entitled "Assertion Quality Assessment and Management System", filed Jan. 23, 2013. For example, a snip object can represent a fact or a point that is supported by an information source. A snip object can also represent opinion or a conclusion that is derived from an information source. Other snip objects can represent an observation or a perception that is based on an information source. Snip objects can further be implemented as metadata objects having a similar structure and relationship among other metadata objects as described in co-owned U.S. patent application 61/739,367 entitled "Metadata Management System", filed Dec. 19, 2012. For literals that have a temporal dimension, such as a video clip or an audio clip, the snip object metadata may include a temporal range (e.g., indicating a beginning time and an end time) selected by the users from within the literal object.

Referring back to FIG. 1a, the point management system 100 includes a point management module 156, a point authoring module 150, a snip verification engine 158, a user interface module 154 and an output interface 160. The user interface module 154 communicates with computing devices 172, 174 and 176 over a network 170. Network 170 could be the Internet, a virtual private network, corporate network or any network known in the art for enabling computer networking across a collection of computer users. Computing devices 172, 174 and 176 are shown here as a portable computer, tablet and a smartphone respectively, but could be laptops, wearable devices or any computing device known in the art capable of communicating over a network. Users 177 behind the computing devices 172, 174 and 176 interact with different point objects through the user interface module 154 of the point management system 100. Point management system 100 may also include user database 185 for storing user information, including users that have created point objects, snip objects, or otherwise related to objects stored in point database 110, snip database 120 or literal database 130. Examples of functions the point management system 100 executes in response to inputs from users include embedding a snip object at a specified insertion point within a point object (FIG. 10), validating and presenting a snip object for viewing within a point object (FIG. 11) and verifying a snip object within a point object (FIG. 12). In some embodiments, point management system 100 includes a metadata management module 144 implemented as a metadata management system described in co-owned U.S. patent application 61/739,367 entitled "Metadata Management System", filed Dec. 19, 2012.

FIG. 6a illustrates an example point user interface 600 which, in some embodiments, can be generated by the point authoring module and present at the user computing devices 172, 174 and 176 through the user interface module 154. As shown in FIG. 6a, the point user interface displays different attributes of a point object. For example, the point user interface 600 displays point name 215, point content 220 and point author 235. Point user interface 600 comprises word processing functionality, which can be a rich text editor, HTML editor, word processor, presentation-authoring, blog or wiki authoring system or any other means known in the art for authoring and editing digital documents. In FIG. 6*a*, the point user interface 600 is shown to be in an edit mode, which enables a user to author and edit point content 220 using authoring and editing tools contained on authoring toolbar 605.

In addition, point user interface 600 is in communication with snip search engine 152 within point authoring module 150 through user interface module 154. Point user interface 600 is shown here as including a snip insert button 615 and keyboard shortcut 620 (typing the "@" symbol) for initiating a query of the snip database 120 through the snip search engine 152. Upon initiating of snip insert button 615 or keyboard shortcut 620, snip search box 625 appears and snip search engine 152 initiates a query of the snip database 120 based on keystrokes type into snip search input 630 by a user. Accessible snip subset 635, here shown as a list of snip objects according to snip titles 325, presents to the user a list of snip objects that user has access to within the snip database 120 according to rights policy data 370. Rights policy data 370 may be governed by the metadata management module 144 in some embodiments, implemented as the metadata management system described in co-owned U.S. patent application 61/739,367 entitled "Metadata Management System", filed Dec. 19, 2012. In another embodiment, rights policy data 370 is governed by the rights policy data 550 of the literal objects that are referenced within the snip objects by literal ID 505. In such an embodiment, the point management system enables a user to access a snip object when the user has access to the literal object, and does not enable a user to access a snip object when that user does not have access to the literal object referenced by the snip object by literal ID 505.

Snip search engine 152 dynamically filters the accessible snip subset 635 as the user inputs characters into snip search input 630. In this embodiment, snip search engine 152 is shown filtering accessible snip subset 635 based on matching the string of characters user has input into snip search input 630 with snip titles 325 and presenting only the matching snip objects. Upon user selection of a snip object within the accessible snip subset 635 (including as-filtered by snip search engine 152), the selected snip object is inserted into point content 220 as a linked snip object. The sort order of snip object query results presented to the user may be as illustrated in co-owned U.S. provisional patent application No. 61/968,494 entitled "Authoring System and Method for Incorporating Organizational Knowledge into Written Communications", filed Mar. 21, 2014. In some embodiments, snip objects are accessed from a graph, examples of which are illustrated in co-owned U.S. patent application 61/755,839 entitled "Assertion Quality Assessment and Management System", filed Jan. 23, 2013 as well as co-owned U.S. patent application No. 61/968,494 entitled "Authoring System and Method for Incorporating Organizational Knowledge into Written Communications," filed Mar. 21, 2014.

As shown in FIG. 1*b*, in the preferred embodiment, point objects 10 incorporate a multi-layer data structure. Point objects 10 represent work-product created by a point author, and can include, but not limited to, the author's conclusions, points, thoughts, ideas, findings and organizational structures related to snip objects processed by the point author. As shown in FIG. 1*b*, point objects include a point layer 60 connected to a snip layer 40 through a point-snip verification link 50. In point layer 60, points made by a user may be represented as a bulleted or numbered list, a hierarchical point structure (e.g. outline) which could consist of one or more levels, or narrative paragraph(s) of text. Point objects further include a literal layer 20 comprised of literal objects and a snip layer 40 comprised of snip objects which include excerpts of documents or other forms of literal objects along with any metadata added by the snip creator or other viewers. The snip objects are connected to the literal objects through snip-literal verification link 30.

Snip objects in the snip layer 40 may include any snip objects to which the point author has access, including those created by the point author or others. The snip objects are associated with the point objects via the point-snip verification link 50 enabling the point author, and anyone provided access to the point object, to navigate to viewing the snip objects. Additionally, the snip objects are associate with the literal objects from which they were captured via the snip-literal verification link 30, including at the precise location within the literal objects from where they were derived so the reviewer of a point object can see the full context of all the snip objects that have been embedded inside the point object.

Point objects 10 can include a network address 12, here shown in FIG. 1*b* as a URL pointing to an address on the public Internet. Network address 12 could be any network address known to those skilled in the art. Publishers of point objects 10 can share the point objects in web pages and documents by inserting the network address 12 associated with the published point object into the web pages or documents as a hyperlink. When viewing a published point object 10, snip objects that are associated with the point object are visually identified such that the viewer can open/expand the snip object to view its contents. As shown in FIG. 7*a*, inactive linked snip button 720 is shown in a user interface embodiment as a buttonized-word that, when clicked, transforms into an active linked snip button 730 and expands the point object to reveal the contents of the snip object as shown in detail in FIG. 7*a*.

Users with access to the point object 10 may make comments on the point object, here shown in FIG. 1*b* as team point-snip collaboration 45. Comments on the point object are separate and distinct from comments placed on snip objects, which are shown in FIG. 1*b* as team snip-literal collaboration 25. This creates a two-level commenting system, wherein snip comments represent comments on the snip object itself, and point-level comments represents comments on the point object and/or how that point object relates to snip objects associated with it (e.g. how well they provide support for the point, or relate to the point being made).

As shown in FIG. 1*b*, each object type depicted in this application may correspond to a separate layer within the data structure, with the objects being stored within a separate database. Point layer 60 incorporates point objects which are stored in point database 110, and may be created by, and accessed by, a distinct set of users from snip layer 40 and literal layer 20 as specified in the rights policy data 250 associated with point database 110. Snip layer 40 incorporates snip objects which are stored in snip database 120, and may be created by, and accessed by, a distinct set of users from point layer 60 and literal layer 20 as specified in the rights policy data 370 associated with point database 110. Literal layer 20 incorporates literal objects which are stored in literal database 130, and may be created by, and accessed by, a distinct set of users from point layer 60 and snip layer 40 as specified in rights policy data 550 associated with literal database 130.

Point objects in point layer 60 can incorporate user point-snip assertions 55, which comprise assertions of a user about the snip object referenced by the point object. Team point-snip collaboration 45 may include team or co-worker assessment of the merits of the user point-snip assertions 55. Additionally, snip layer 40 can incorporate user snip-literal assertions 35, which comprise assertions of a user about the relationship of the snip object to the literal object from which the snip object was derived or captured. The team snip-literal collaboration 25 may include team or co-worker assessment of the merits of the user snip-literal assertions. Assessment of the above described assertions via the above-described collaboration is described more fully in co-owned U.S. patent application 61/755,839 entitled "Assertion Quality Assessment and Management System", filed Jan. 23, 2013 and incorporated herein.

Figure 2:
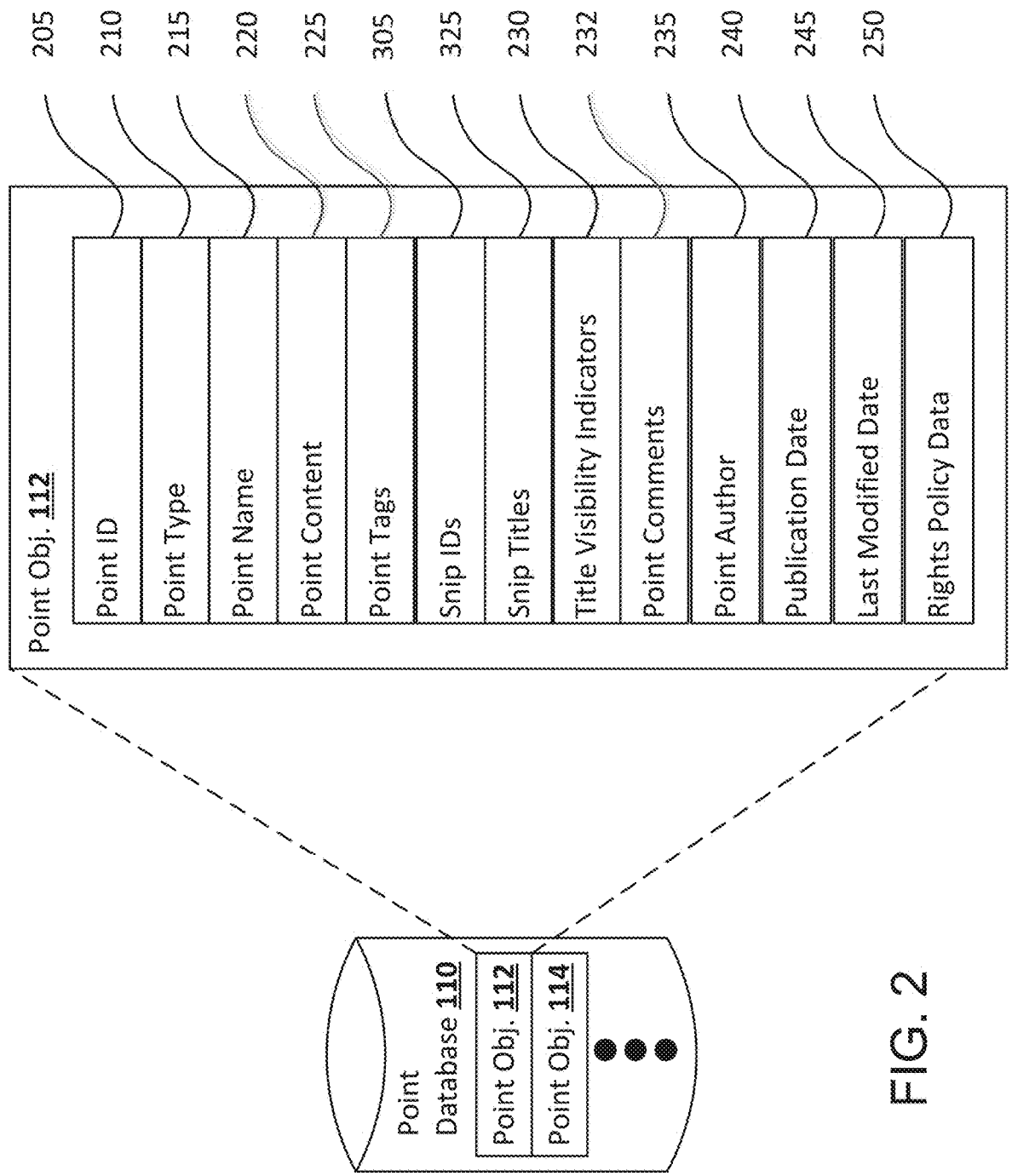
FIG. 2 provides an illustrated example of a point database.

As shown in FIG. 6a, linked snip objects can be presented in the point user interface 600 as a linked snip title 645 which incorporates the snip title 325 into the visible authored content within the point content 220, or as a linked snip indicator 647 which does not incorporate the snip title 325 into the visible point content 220, but rather presents an indicator appearing more analogous to a footnote. The title visibility selector 640 enables a user to make this selection, which is then stored as part of the point object as title visibility indicators 230 as shown in FIG. 2. In FIG. 6a, the linked snip count 650 presents the number of snip objects that are embedded in the point object to users.

In FIG. 7a, the point user interface 600 is shown in a display mode, which can be triggered by user selecting a save function on authoring toolbar 605. In display mode, user interface 600 is configured to present attributes of the point object such as point name 215 and point author 235. Point user interface 600 is further shown presenting linked snip objects as inactive linked snip buttons 720 and active linked snip buttons 730. When selected by a user for viewing, snip buttons become active linked snip buttons 730, creating a snip display space 735 within the point content, and displaying the associated snip object 122 within the point user interface. The point content 220 (as shown in FIG. 6a), splits into upper viewable point content 611 that is above the displayed snip object and lower viewable point content 612 that lies below the displayed snip object. Here the displayed snip object is shown as including the snip title 325, creator 350, snip note 330, snip comments 347 and snip image 335. The snip-text switch 740 enables a user to view the snip text 340 associated with/extracted from the snip image 335. The visual association between snip objects and point objects may be depicted using any method known to those skilled in the art, including but not limited to showing part of the snip object under the point object. Other embodiments can be appreciated, such as displaying snip objects and point objects in adjacent columns and drawing splines between point objects and associated snip objects, rotating snips into the viewport for display next to point objects when point objects are selected by the user. Point comments 232 are shown in FIG. 7a at the bottom of the point object. In other embodiments, point comments may be at the paragraph or bullet level within a point object.

Figure 7B:
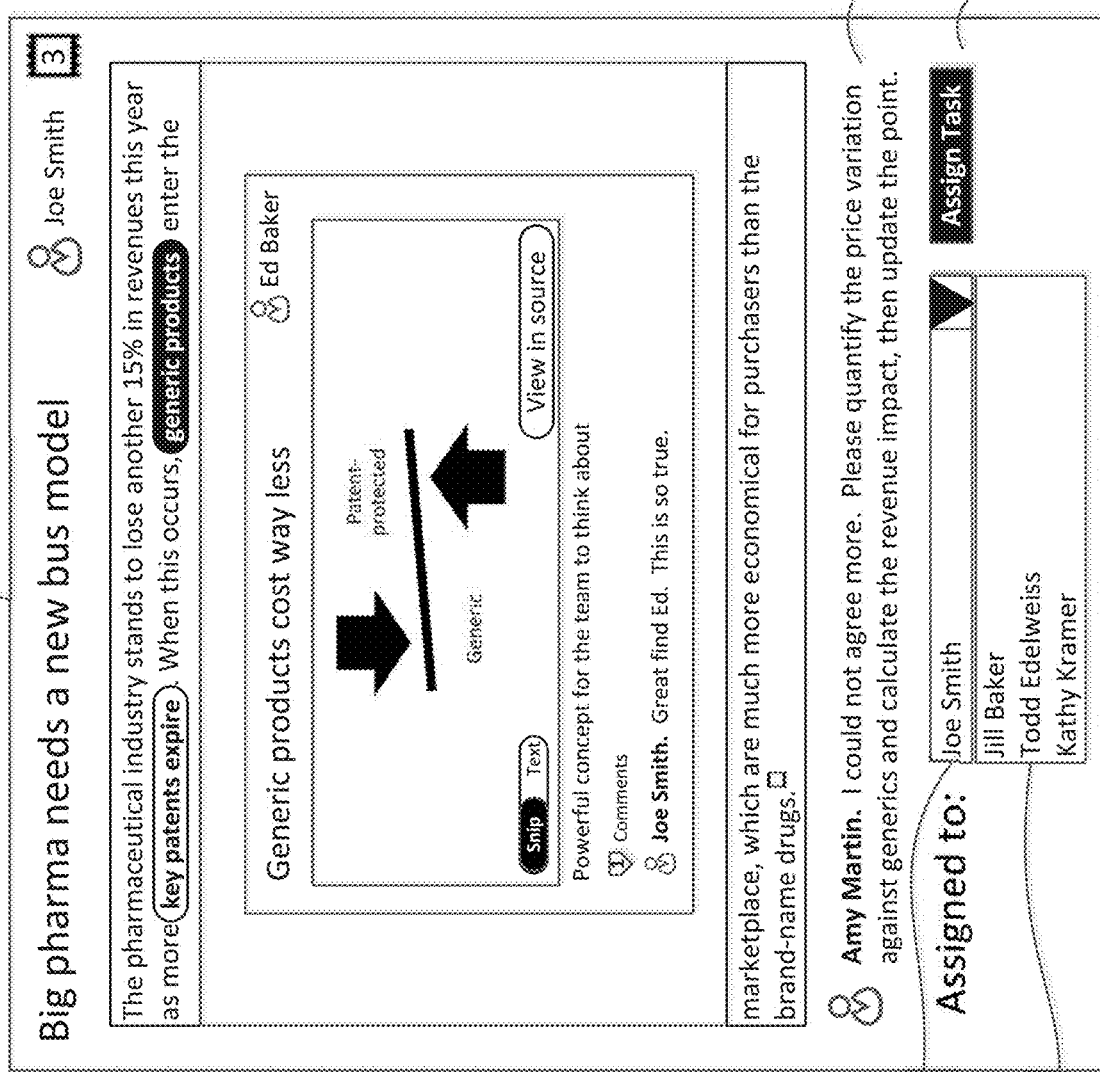
Figure 15:
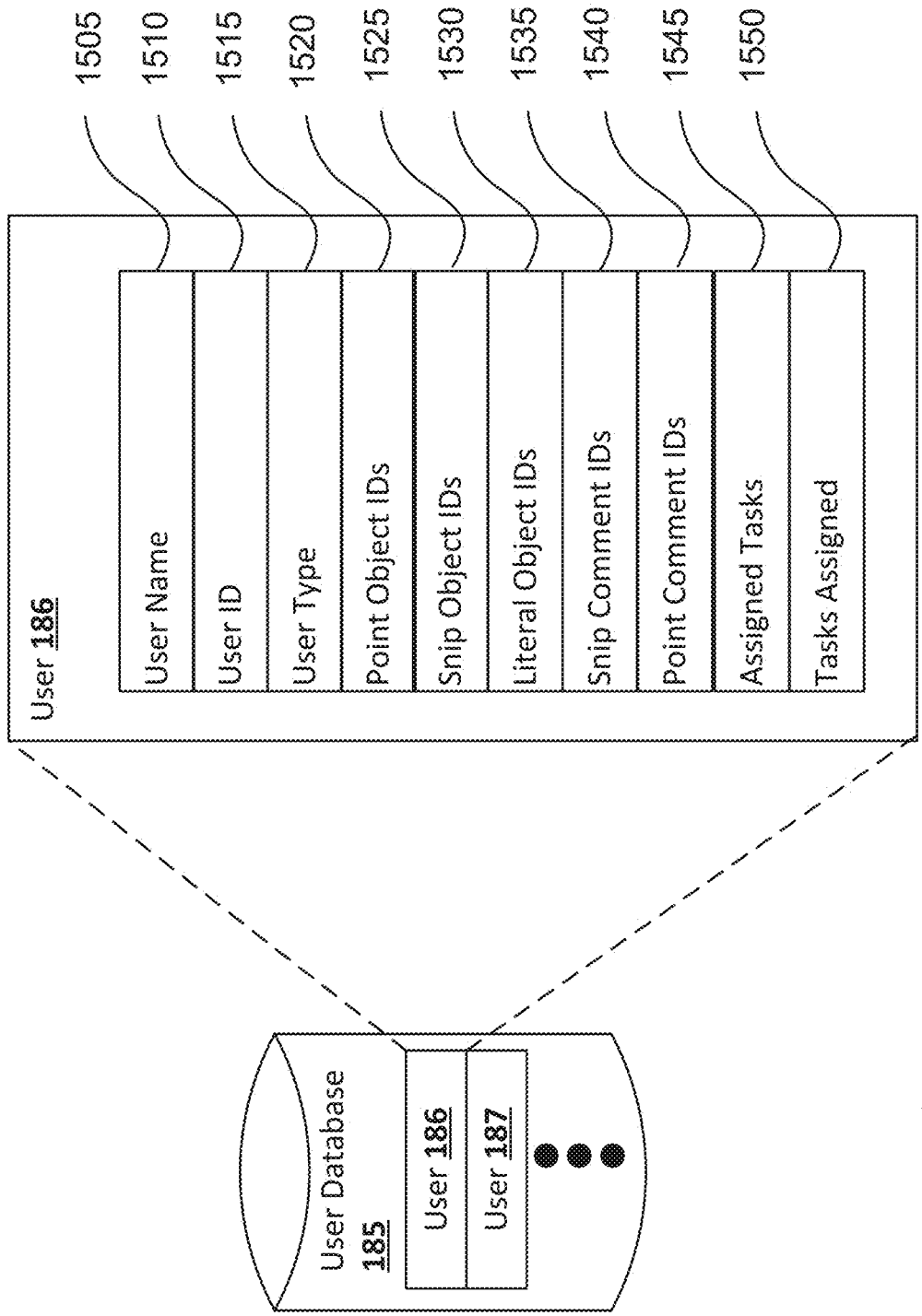
FIG. 15 illustrates an example data structure for a user object.

In an alternative embodiment, the point user interface 600 is configured for assignment of point comments 232 as tasks as shown in FIG. 7b. The comment creator 925 can select a task assignee 795 from a list of eligible users 790 here shown as a dropdown list containing user names. Upon activation of the task assignment button 780, the assigned task 1545 is stored in user database 185 as shown in FIG. 15.

Figure 7C:
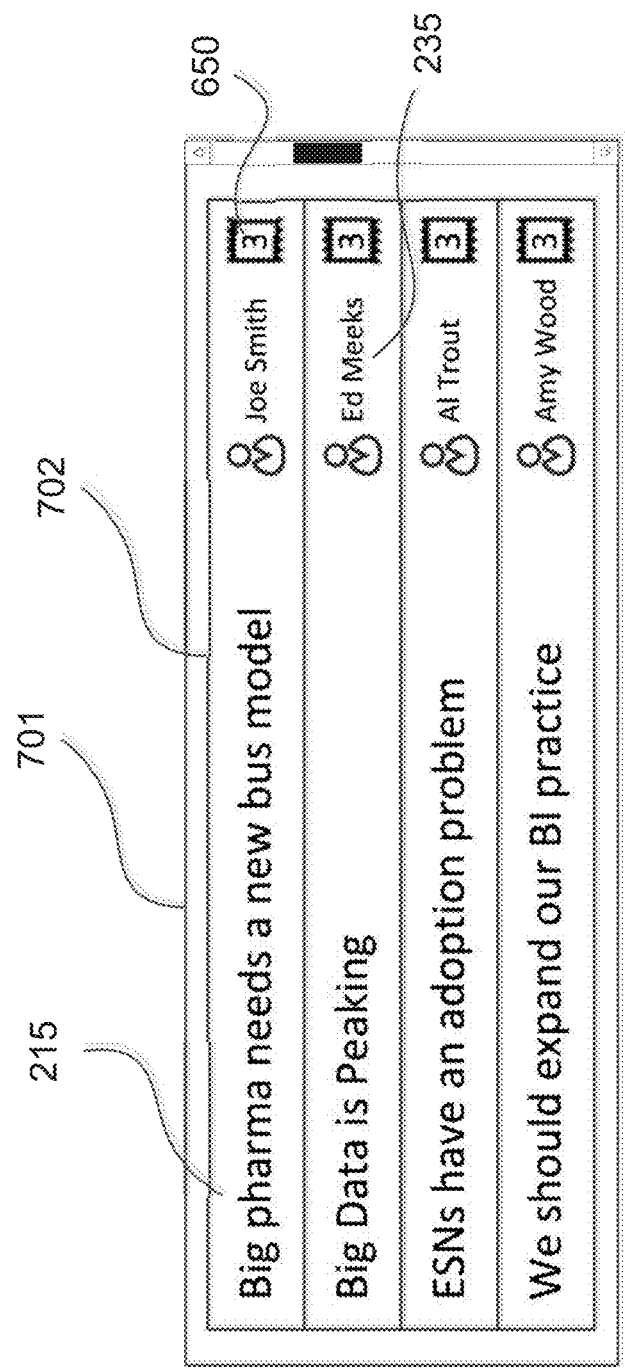

As shown in FIG. 1a, point management system 100 may include point management module 156, which in some embodiments can be configured to generate point navigation interface 701 as shown in FIG. 7c. As shown in FIG. 7c, the point navigation interface displays different attributes of a point object. The point navigation interface 701 may be configured to display a list of collapsed point objects 702 from point database 110. Point objects are shown in FIG. 7c displayed to users as a list of point titles, representing a collapsed form of a point object, which can be expanded upon user activation to display all points and associated snip objects for that point object as shown in FIG. 7a.

Figure 8:
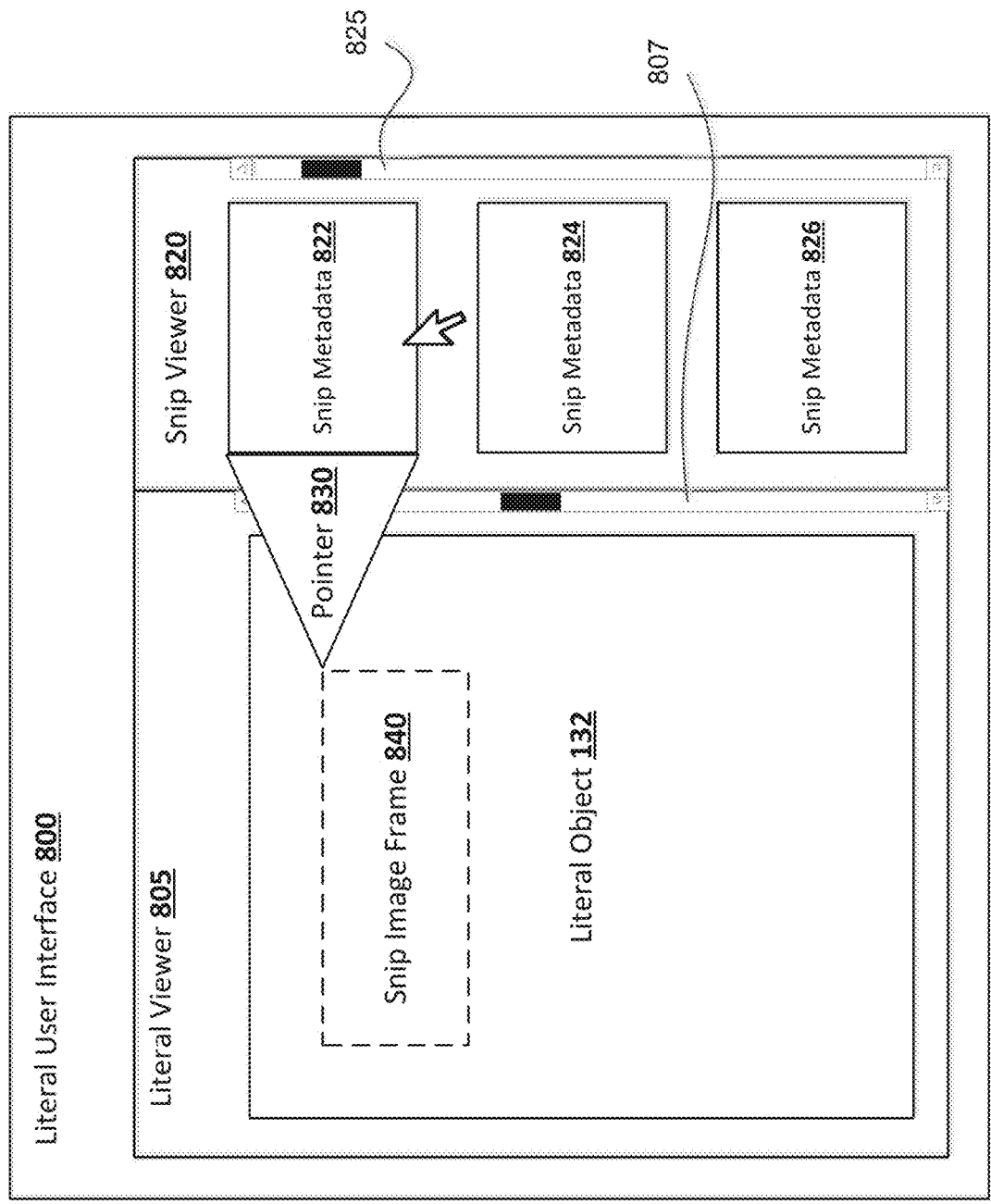
FIG. 8 illustrates a user interface of some embodiments for verifying a snip object.

As shown in FIG. 1a, snip verification engine 158 is also in communication with point authoring module 150, user interface module 154, snip database 120, literal database 130 and literal user interface 800 (as shown in FIG. 8). In some embodiments, when a user selects the view in source activator 770 shown in FIG. 7a, the snip verification engine 158 can generate literal user interface 800 (shown in FIG. 8). As shown in FIG. 8, literal user interface 800 includes a literal viewer 805 and snip viewer 820. Literal viewer 805 may comprise a document viewer, such as a web-based document viewer, a universal document viewer, a PDF viewer, an e-Book viewer, a web browser or any digital document viewer known in the art. Literal viewer 805 may also comprise a video player, audio player or image viewer. Literal viewer 805 is configured to load and display literal objects from the literal database 130 upon instruction from snip verification engine 158, according to literal IDs 505 referenced by the snip object displaying the view in source activator 770 selected by the user.

Figure 3:
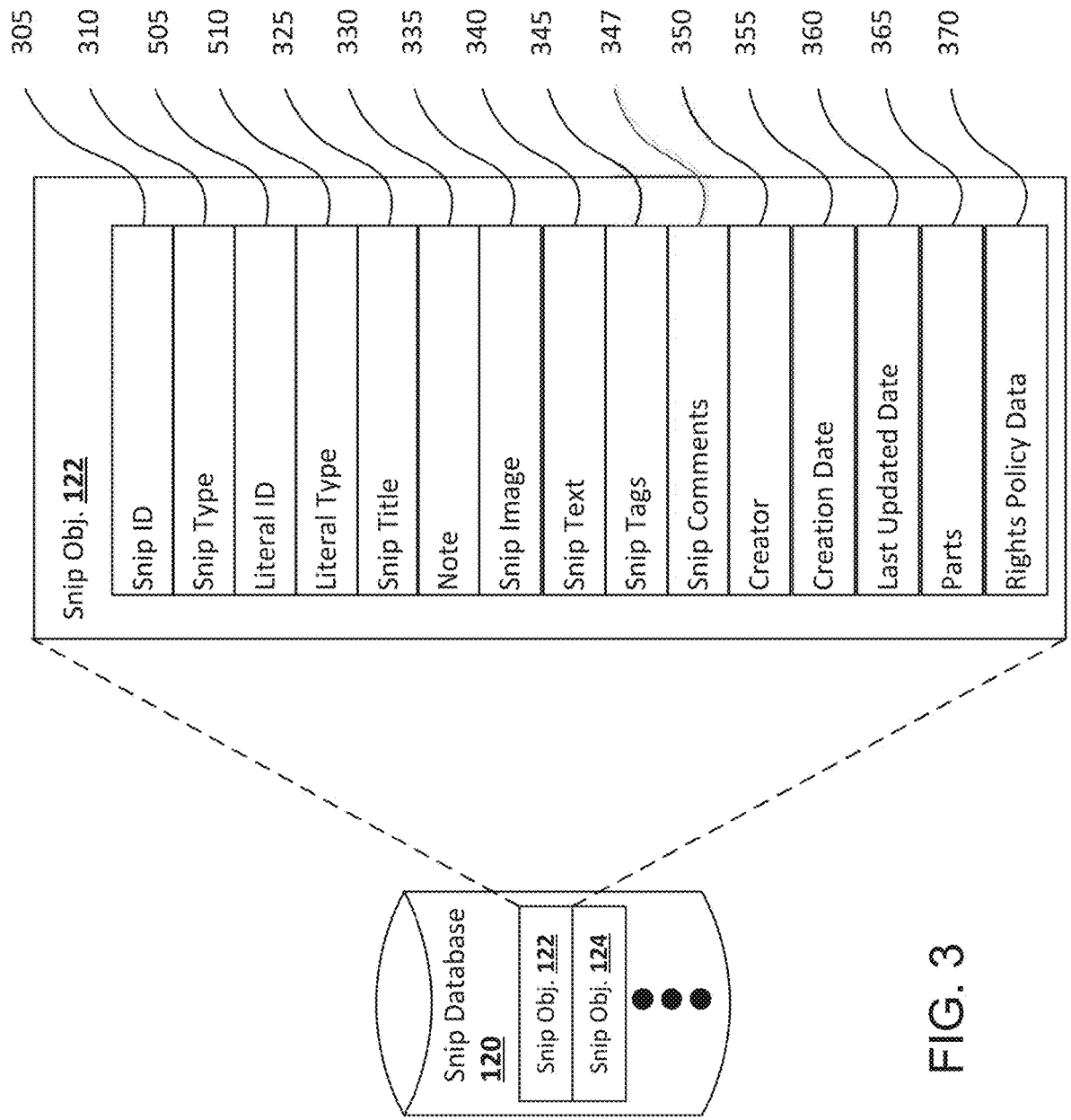
FIG. 3 provides an illustrated example of a snip database.

Literal user interface 800 further includes a snip viewer 820. Snip viewer 820 is configured to display snip metadata associated with literal objects displayed in the literal viewer 805. For example, as shown in FIG. 8, snip metadata 822, snip metadata 824 and snip metadata 826 may represent various attributes of snip objects including snip titles 325, notes 330 and snip tags 345 that are associated snip objects snipped from literal object 132. Snip metadata could include other snip object attributes, including snip type 310, creator 350, snip comments 347 or any snip object attribute that comprises snip objects as shown in FIG. 3. In FIG. 8, snip metadata 822 is shown as being selected by a user. Snip verification engine 158 then instructs literal viewer 805 to display the page of literal object 132 corresponding to page number 410 in parts 365 associated with the corresponding snip object. Snip verification engine 158 further positions snip image frame 840 according to the top coordinate 415, left coordinate 415, width 425 and height 430 associated with the selected snip object. Literal user interface 800 is further configure to draw pointer 830 to visually display the relationship between snip metadata 822 and the snip image frame 840. In operation, if the user then selected snip metadata 824, the process would repeat, literal viewer 805 would rotate to the page associated with the snip object referenced by snip metadata 824 and the snip image frame 840 would be positioned according to the snip object referenced by snip metadata 824.

In order to make it easier for the viewer to verify a snip object, when the user selects the view in source activator 770, instead of displaying the literal object from the beginning, snip verification engine 158 configures literal user interface 800 to display the literal object in such a way that the portion of the literal (the snip image) associated with the snip object is immediately viewable within the literal viewer 805 as outlined by the snip image frame 840 without user's interaction. In some embodiments, this feature requires the literal viewer 805 to scroll a document to a spot where the snip image is shown, based on the data contained within parts 365 of the snip object.

Referring back to FIG. 7a, if the user selected active linked snip button 730 a second time, snip display space 735 would close, causing snip object 122 to disappear from view and upper visible point content 611 and lower visible point content 612 to merge together. Point user interface 600 is further configured to allow a user to insert point comments 232 and presents point comments 232 that have already been inserted by others. A user can insert point comments 232 by inputting their comment into point comment input field 750 and submitting the point comment for saving within point database 110 by selecting point comment add button 760. When a user has access to edit a point based on rights policy data 250, the point user interface 600 returns to edit mode when the user selects point edit activator 710.

FIG. 6b shows an alternative embodiment of snip search box 625, here shown as presenting collapsed snip objects 665 within an accessible snip subset 635. When a user hovers their mouse over a collapsed snip object 665, a single snip add button 670 is revealed as well as a snip selection checkbox 680 for selection of multiple snip objects for insertion upon selection of multiple snip add button 660 by the user. When a user clicks on a collapsed snip object 665, it transforms into an expanded snip object 675, opening a display space 735 and presenting snip object 122. As shown in FIG. 6b, the snip object 122 may be shown including different attributes of a snip object, such as snip title 325, snip image 335, creator 350, note 330, comments 347 and snip-text switch 740 enabling a user to view the snip text 340 associated with the snip image 335.

The point database 110 of some embodiments is implemented in a non-transitory permanent data storage such as a hard drive, a flash memory, etc. In some embodiments, the point database 110 can be a file system, database management system, a binary large object (BLOB), a document, a table, etc. The point database 110 stores point object 112 and point object 114.

Each point object also includes a set of attributes. FIG. 2 illustrates an example point object in more detail. Specifically, FIG. 2 shows point object 112 and point object 114 that are stored in the point database 110. FIG. 2 also illustrates a set of attributes that is stored within the point object 112. These attributes only represent examples of the kinds of attributes that can be included within a point object. The point objects of some embodiments can add attributes to or remove attributes from this set to better suit a particular situation.

The point ID 205 is used to uniquely identify a point object. It can be a number, a string, a GUID, a URL, or any other type of unique identifier. It can be used as a reference identifier when it is referenced by a snip object. It can also be used for storing the point object and retrieving the point object from the point database 110.

The point type 210 of a point object can be used to indicate a type of the point. Points are digital documents, and can be a report, presentation, argument, blog, post, message or any form of digital document. The point name 215 is used to store user input that labels the point object, and in some embodiments can represent a point author's main point, conclusion, recommendation or other assertion. The point content 220 comprises the content of the point, which may include narrative paragraph(s) of text, bulleted or numbered lists, a hierarchical structure (e.g. outline), linked or embedded pictures, video files, audio files or other digital document files. Point tags 225 are used to store any keyword tags that a user associates with a point object 112. The snip ID 305 is used to uniquely identify snip object that a user has linked within the snip object 122.

Title visibility indicators 230 are used by the point authoring module 150 to determine whether the snip titles 325 should be displayed to users within the point object body as shown in FIG. 6a and FIG. 7a.

Figure 9A:
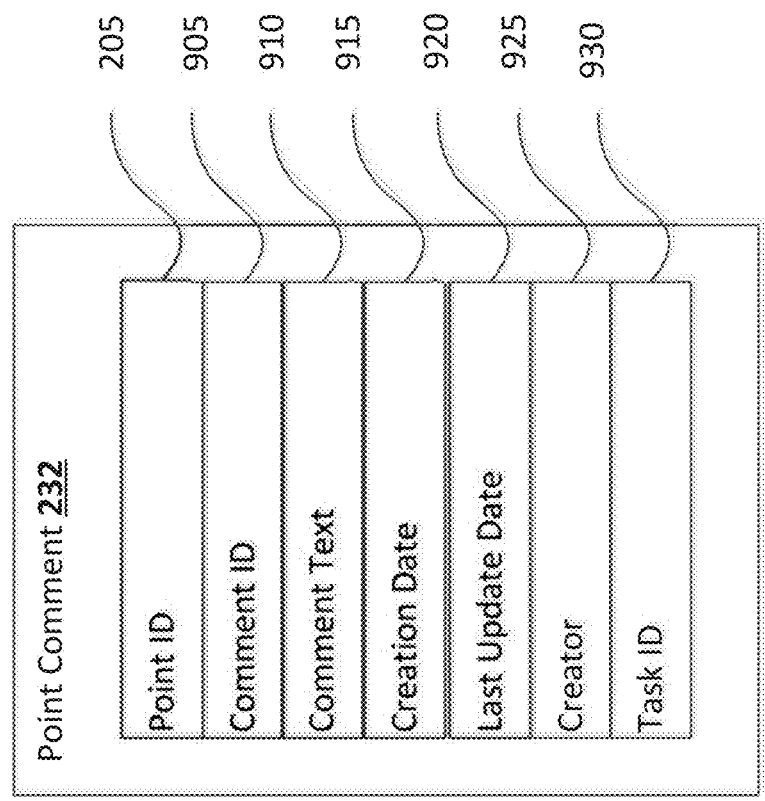
FIGS. 9a-9b provides an illustrated example of snip and point comment data structures.

Point comments 232 are comments that users who have access to view the point object can input regarding the point object. As shown in FIG. 9a, point comments 232 include a point ID 205, comment ID 905 that uniquely identifies the comment, comment text 910 that has been input by a user, creation date 915 which indicates the date when a user input the comment text 910, last update date 920 which indicates the date that a user of the point management system 100 last updated the comment text 910, creator 925 that identifies a user who created the point comment 232 and comment ID 930 which indicates whether the point comment is a comment or a task, and if a task, the ID of the task.

Referring back to FIG. 2, the point author 235 identifies a user who authored the point object 112. The publication date 240 indicates the date that the point author published the point object 112. The last modified date 245 indicates the date that a user of the point management system 100 last modified the point object 112.

The snip database 120 of some embodiments is implemented in a non-transitory permanent data storage such as a hard drive, a flash memory, etc. In some embodiments, the snip database 120 can be a file system, database management system, a binary large object (BLOB), a document, a table, etc.

Each snip object also includes a set of attributes. FIG. 3 illustrates an example snip object in more detail. Specifically, FIG. 3 shows snip object 122 and snip object 124 that are stored in the snip database 120. FIG. 3 also illustrates a set of attributes that is stored within the snip object 122. These attributes only represent examples of the kinds of attributes that can be included within a snip object. The snip objects of some embodiments can add attributes to or remove attributes from this set to better suit a particular situation.

The snip ID 305 is used to uniquely identify a snip object. It can be a number, a string, a GUID, a URL, or any other type of unique identifier. It can be used as a reference identifier when it is referenced by a point object. It can also be used for storing the snip object and retrieving the snip object from the snip database 120.

The snip type 310 of a snip object can be used to indicate a type of the snip. For example, as mentioned above, one embodiment of snip objects is when they comprise assertion objects which represent a relationship between an assertion and an information source (e.g., an opinion, conclusion, perspective, etc.). Thus, the snip type 310 of some embodiments can indicate n snip type of the snip object.

The literal ID 505 is used to uniquely identify a literal object from which the snip was derived, and can be used reference identifier when it is referenced by snip object 122. It can be a number, a string, a GUID, a URL, or any other type of unique identifier.

The literal type 510 is used to indicate a type of the literal. As mentioned above, a literal could comprise a digital document, web page, e-Book, blog, picture, video, audio or other form of digital content known in the art, and in some embodiments may further identify the format of the literal.

The snip image 335 represents an image extracted from a snip object 122 based on user selection, and snip text 340 represents text captured from a snip object 122 based on user selection, or extracted from snip image 335. The snip title 325 is used to store user input that labels the snip object, note 330 is used to store associated notes that are input by a user and snip tags 345 is used to store any keyword tags that a user associates with a snip object 122.

Figure 9B:
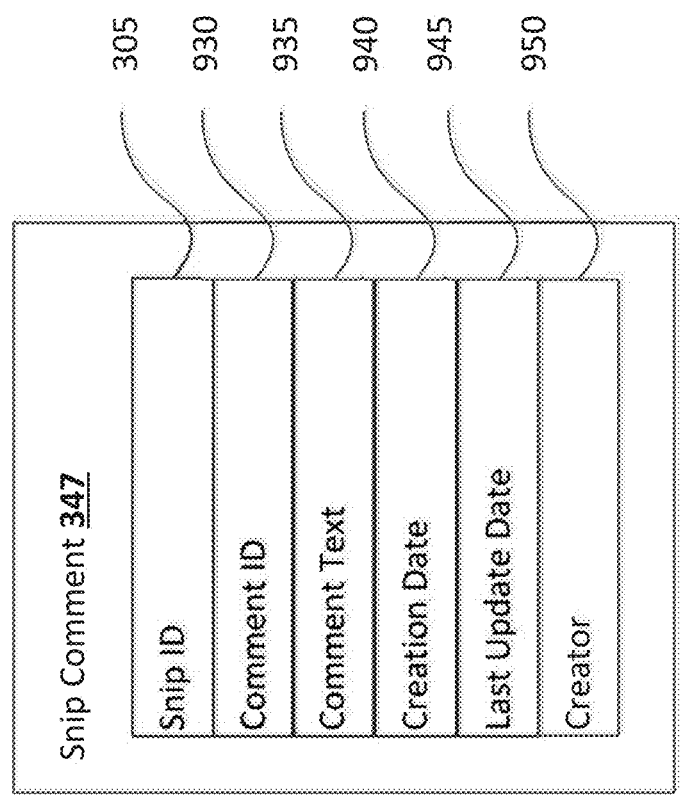

Snip comments 347 are comments that users who have access to view the snip object can input regarding the snip object. As shown in FIG. 9b, snip comments 347 include a snip ID 305, comment ID 930 that uniquely identifies the comment, comment text 935 that has been input by a user, creation date 940 which indicates the date when a user input the comment text 935, last updated date 945 which indicates the date that a user of the point management system 100 last updated the comment text 935 and creator 950 that identifies a user who created the snip comment 347.

Referring back to FIG. 3, the creator 350 identifies a user who created the snip object 122 by selecting an excerpt from a literal object 132. The creator 350 can be a name, a number (e.g., social security number), or a string of characters. The creation date 355 indicates the date that the creator created the snip object 122. The last updated date 360 indicates the date that a user of the point management system 100 last modified the snip object.

Figure 4:
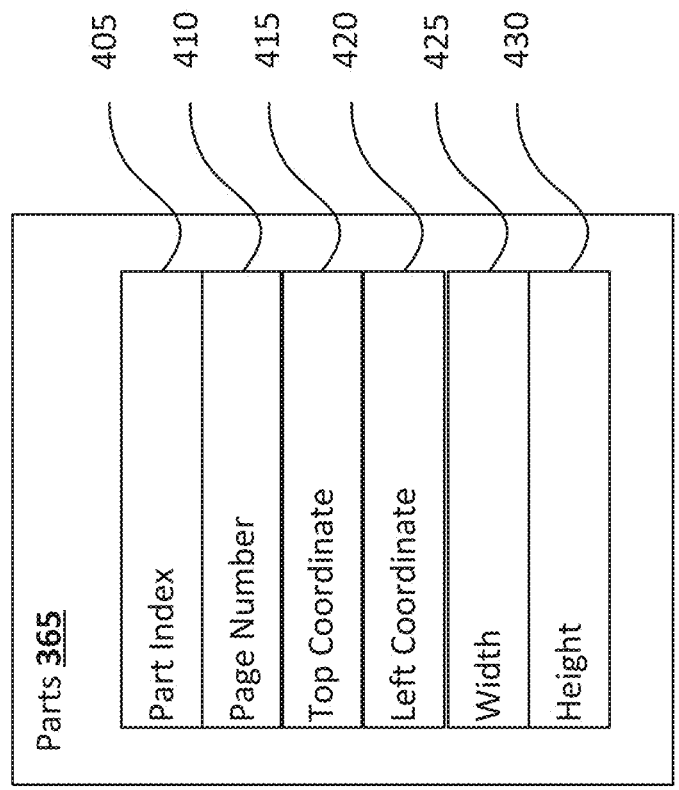
FIG. 4 provides an illustrated example of a portion of a snip database.

As shown in FIG. 3, parts 365 are part of snip object 122. As shown in FIG. 4, parts 365 contains information about the specific location, or locations, of where a snip object was selected by a user from within an literal object, here shown in an embodiment where the literal type 510 is a document where a snip can span one or more pages. Each part in the collection of parts represents one of the potentially many display components of the snip. Parts 365 is shown as including a part index 405 to indicate the specific display part, and a page number 410 for locating the page within the literal object from where the snip was captured for a given display part. Top coordinate 415 and left coordinate 420 are used to locate a corner of the part of the snip object within the literal object, and width 425 and height 430 enable the precise outline of the part of the snip object location within the literal object. Parts 365 could be any data set that enables determination of the spatial location, or locations, of a snip object within a literal object, including a set of coordinates, a time index, a graphical coordinate, a paragraph number, a line number, a word number, a pair of document coordinate attributes or document object model (DOM) element coordinate.

In some embodiments, the snip object 122 can include references to more than one literal object (e.g., when a snip object is derived from a combination of more than one literal object). In these embodiments, the snip object 122 can store more than one literal ID/type pairs.

Referring back to FIG. 3, rights policy data 370 includes information that indicates which users have access to the snip object. In some embodiments, it can include a list of users who have access to the snip object (i.e., a white list), or a list of users who are excluded from accessing the snip object (i.e., a black list). In other embodiments, it can indicate a specific access level (e.g., top security, public, group, etc.) so that only users who have clearance of a specific access level can access the snip object. Rights policy data 370 could also comprise a pointer to an external database that governs access rights to snip objects 122. In other embodiments, rights policy data 370 is based on the rights policy data 550 of the literal object associated with the snip object, with the point authoring module 150 or snip verification engine 158 using literal ID 505 to determine user access to snip object 122. This can be done via database lookup of literal ID 505 within literal database 130 using any method known to those skilled in the art.

At least some of these attributes can be updated or modified during the lifetime of the snip object. In addition, each snip object is distinctly manageable apart from its information source. For example, the snip object 122 can be retrieved from the snip database 120 independent of the literal object from which it was derived. The user can view and modify the content of the snip object independent of the literal object (e.g., viewing the snip object, updating snip object metadata, etc.). The snip object can also be independently published (either in paper form or digital form) without referring to the literal object.

The literal database 130 of some embodiments is implemented in a non-transitory permanent data storage such as a hard drive, a flash memory, etc. In some embodiments, the literal database 130 can be a file system, database management system, a binary large object (BLOB), a document, a table, etc. The literal database 130 stores literal object 132 and literal object 134. Each of the literal objects 132 and 134 comprise a form of digital content, and may comprise a digital document, web page, e-Book, blog, picture, video, audio or other form of digital content known in the art. In some embodiments, the snip verification engine 158 is communicatively coupled with the literal database 130.

Figure 5:
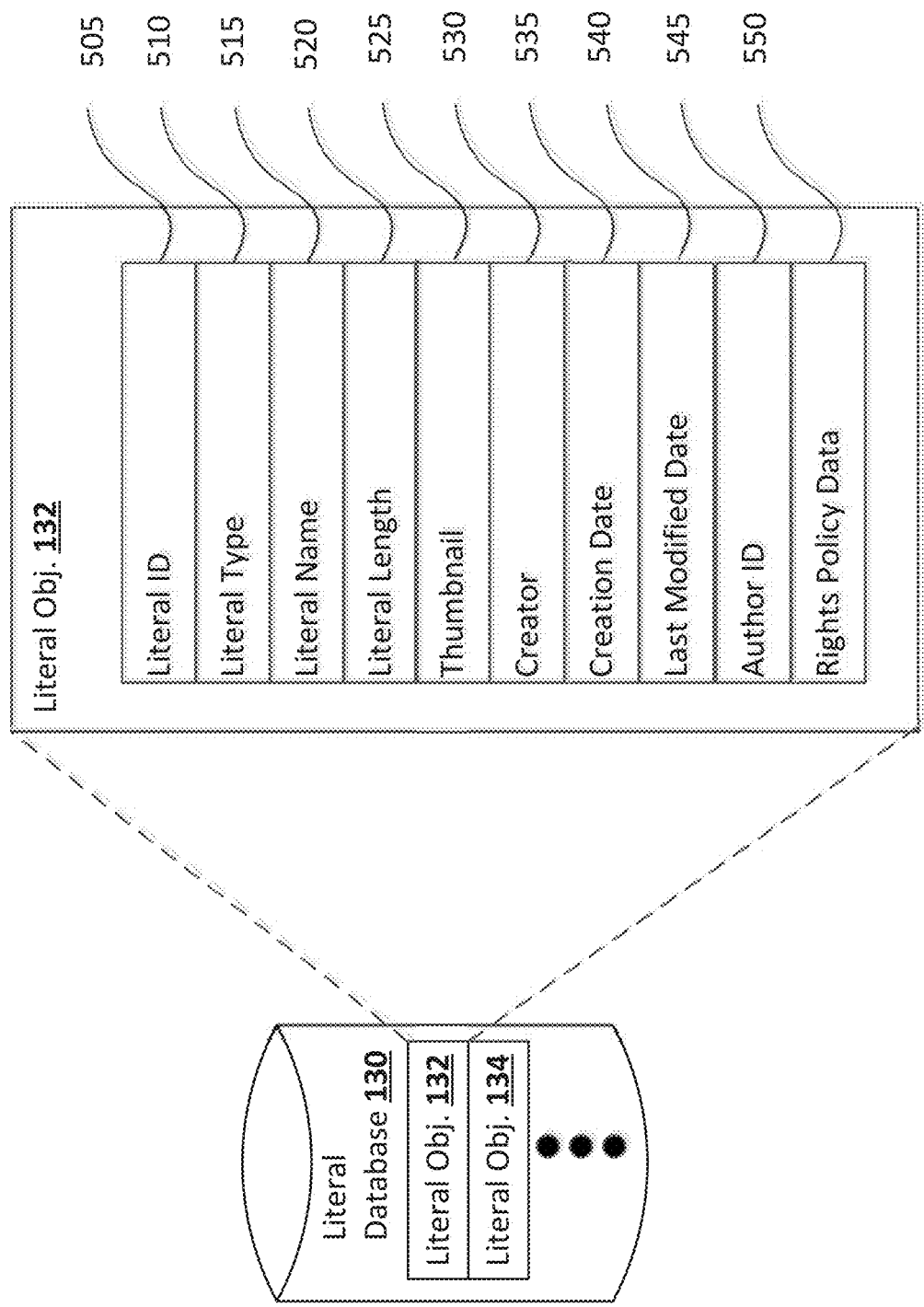
FIG. 5 provides an illustrated example of a literal database.

Each literal object also includes a set of attributes. FIG. 5 illustrates an example literal object in more detail. Specifically, FIG. 5 shows literal object 132 and literal object 134 that are stored in the literal database 130. FIG. 5 also illustrates a set of attributes that is stored within the literal object 132. These attributes only represent examples of the kinds of attributes that can be included within a literal object. The literal objects of some embodiments can add attributes to or remove attributes from this set to better suit a particular situation.

The literal ID 505 is used to uniquely identify a literal object. It can be used as a reference identifier when it is referenced by snip object 122. It can also be used for storing the literal object and retrieving the literal object from the literal database 130. The literal ID 505 can be a uniform resource locator (URL), a uniform resource identifier (URI), an IP address, a file name, an identifier of a document ID such as a digital object identifier (DOI), an object reference, and other types of pointers.

The literal type 510 of a literal object can be used to indicate a type of the literal. As mentioned above, a literal could comprise a digital document, web page, e-Book, blog, picture, video, audio or other form of digital content known in the art. In some embodiments, literal type may further indicate a sub-type of a literal type. For example, when the literal type 510 is a digital document, the literal type 510 may further identify the file format of the document (e.g. PDF, Word®, PowerPoint®).

The literal name 515 stores the name of the literal object. Literal length 520 stores the length of the literal. In the case where the literal object is a digital document, web page or e-Book the literal length 520 may be expressed as a page count. In cases where the literal object is a video or audio, the literal length 520 may be expressed as a duration of the audio or video in minutes and/or seconds. The thumbnail 525 is an image of the literal that can be used to uniquely identify the literal object from other literal objects, and differentiate for human consumption, particularly when displaying lists of literal objects or references to literal objects via an output device 180.

The creator 530 identifies a user who caused the literal object 132 to be added to the literal database 130. The creator 530 can be a name, a number (e.g., social security number), or a string of characters. The creation date 535 indicates the date that the creator caused the literal object to be added to the literal database 130. The last modified date 540 indicates the date that a user of the point management system 100 last modified the literal object.

The author ID 545 identifies the person or persons who originally authored the literal object. The point management system 100 of some embodiments can include another database that stores information of different authors. The system 100 can then retrieve the author's information by querying the database using the author ID 545.

Rights policy data 550 includes information that indicates which users have access to the literal object. In some embodiments, it can include a list of users who have access to the literal object (i.e., a white list), or a list of users who are excluded from accessing the literal object (i.e., a black list). In other embodiments, it can indicate a specific access level (e.g., top security, public, group, etc.) so that only users who have clearance of a specific access level can access the literal object. Rights policy data 550 could also comprise a pointer to an external database that governs access rights to literal object 132.

When creator 530 creates a literal object, some or all of these attributes are generated automatically based on information collected or given by the creator 530. At least some of these attributes can be updated or modified during the lifetime of the literal object.

In some embodiments, the literal database 130 stores literal objects that are associated with a plurality of different literals made by users.

Figure 10:
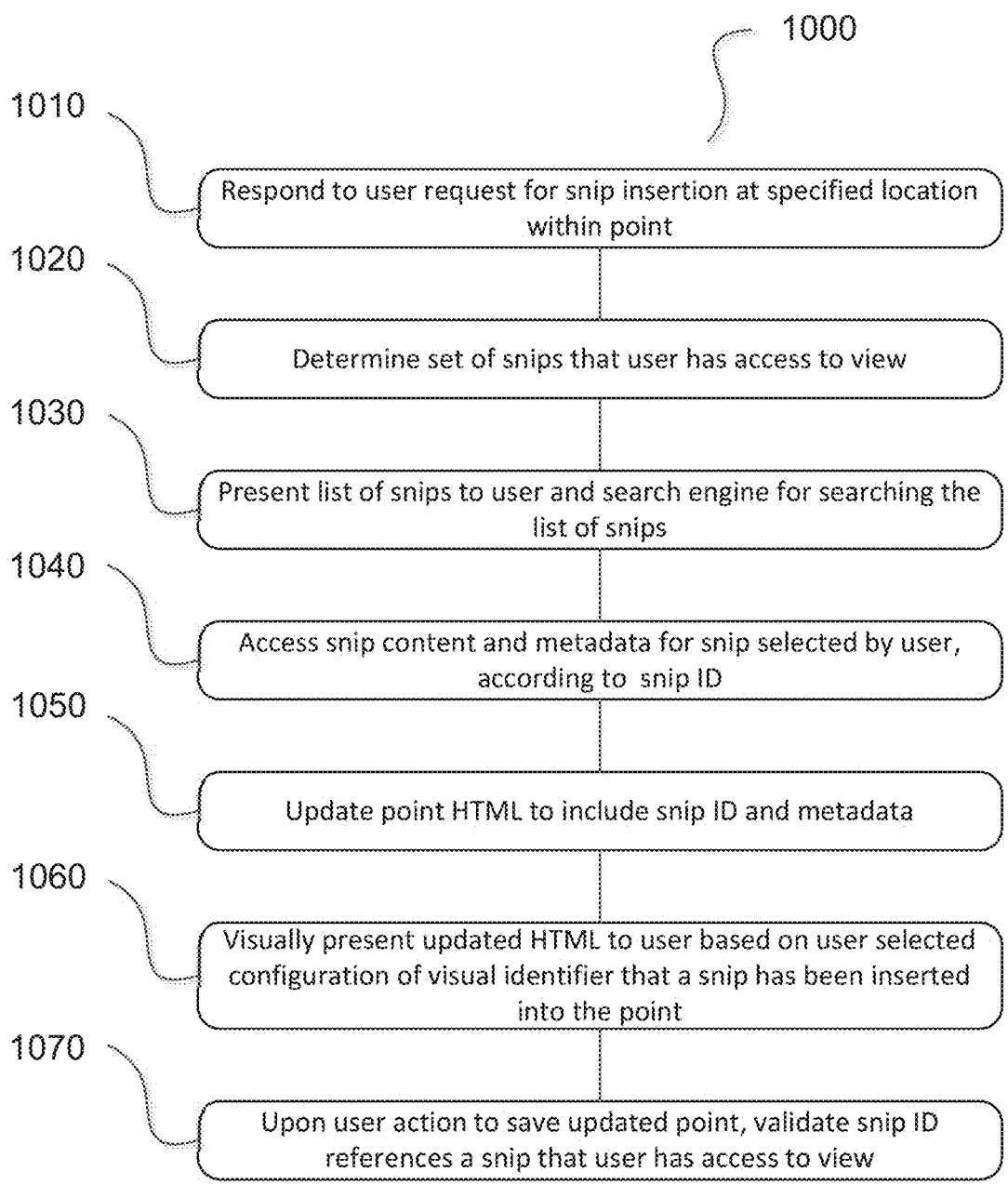
FIG. 10 illustrates an example of inserting a snip object into a point object.

FIG. 10 is a flowchart showing an exemplary snip insertion method 1000 executed by the point management system 100 for accessing and binding a snip object within a point object. The method begins at 1010 with the point management system responding to a user's request for insertion of a snip object at a user-specified insertion point within the point object. At 1020 the point management system determines a set of snip objects that the user has access to view according to the rights policy data governing the user's access to snip objects within the snip object database. At 1030 the point management system presents a list of snip objects to the user along with a snip search engine for searching the list of snips based on inputs from the user which filer the list. At 1040 the point management system accesses the snip content and metadata corresponding with the snip object selected by the user, as identified by snip ID. At 1050 the point management system updates the point HTML to include the snip ID and snip metadata such as snip title. At 1060 the point management system visually presents the updated HTML to a user based on the user-selected configuration of the title visibility indicators that indicate to users that a snip object has been inserted into the point object. At 1070 the point management system responds to a user request to save the updated point by validating that the snip ID references a snip object that user has access to view according to the rights policy data governing the user's access to snip objects.

Figure 11:
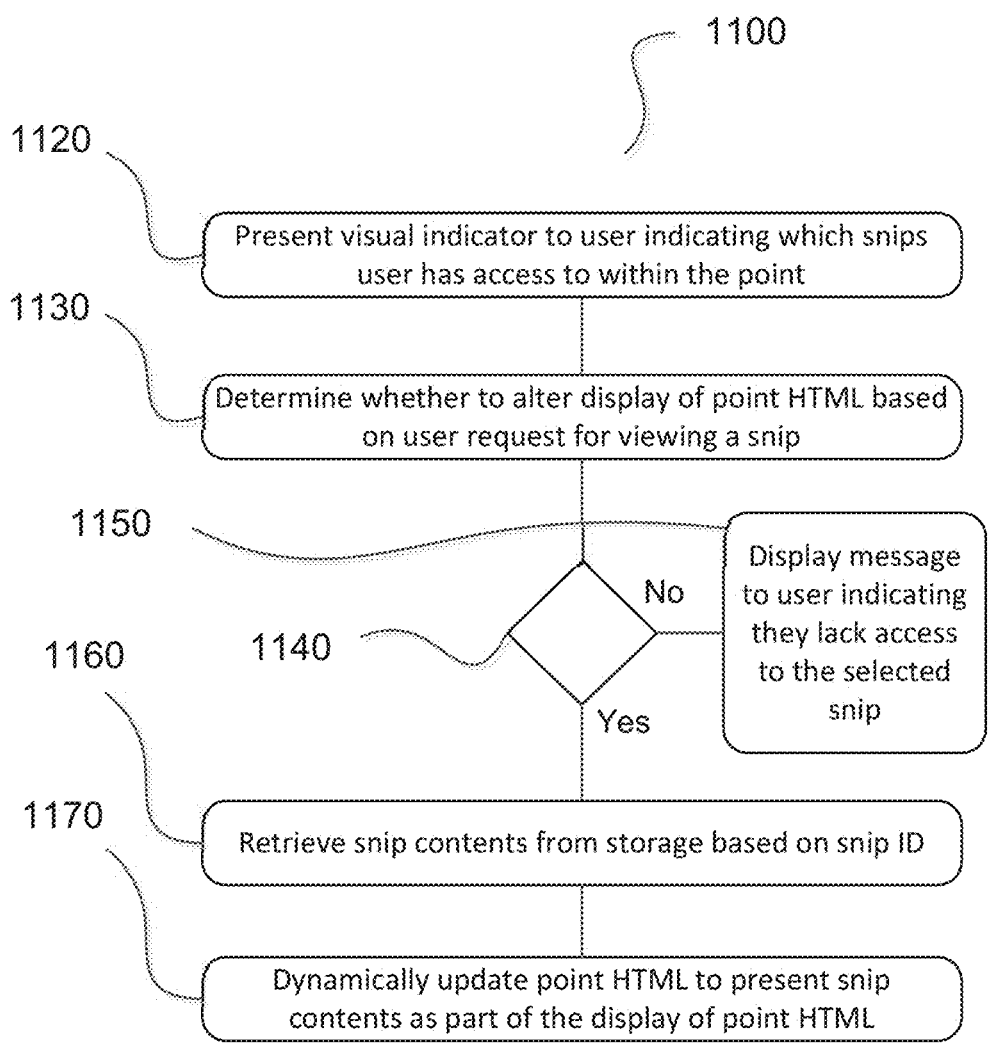
FIG. 11 illustrates an example of viewing a snip object within a point object.
Figure 12:
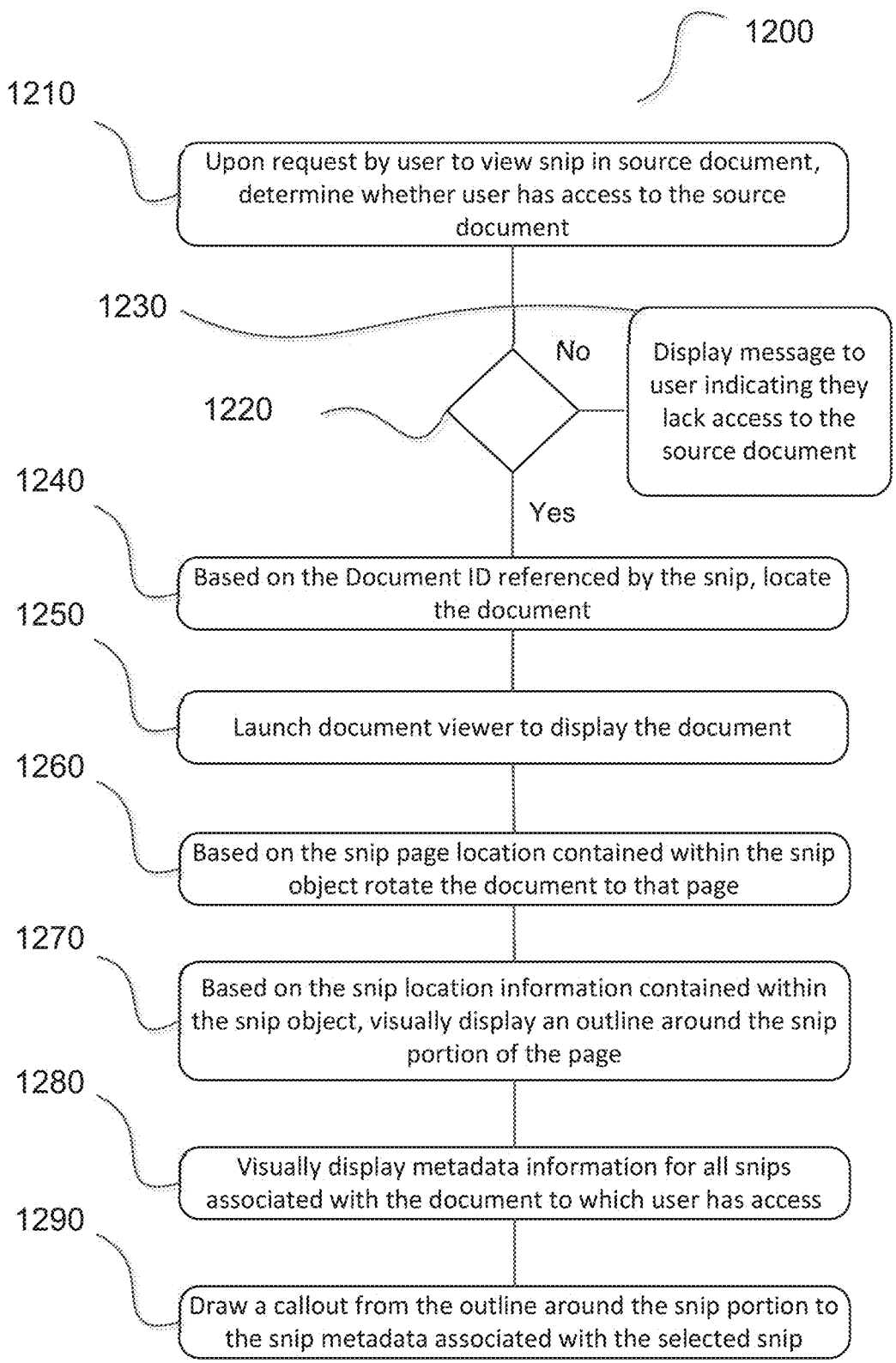
FIG. 12 illustrates an example of verifying a snip object.

FIG. 11 is a flowchart showing an exemplary snip viewing method 1100 executed by the point management system 100 for viewing a snip object that has been linked within a point object. The method begins at 1120 with the point management system presenting visual indicators to the user indicating which snip objects the user has access to within the point object according to the rights policy data governing the user's access to snip objects. At 1130 the point management system responds to a user's request to view a particular snip object by determining whether to alter the display of point HTML based on evaluating the user's access to that snip object. At 1140, if the rights policy does not allow the user access to the requested snip object, then at 1150 a message is displayed to the user indicating they lack access to view the requested snip object. If the rights policy does allow the user to access the requested snip object, then at 1160 the point management system retrieves the snip contents from the snip object database associated with that snip object based on snip ID. Then at 1170 the point management system updates the point object HTML to present the snip contents as part of the display of the point HTML.

FIG. 12 is a flowchart showing an exemplary snip verification method 1200 executed by the point management system 100 for presenting a snip object in the context of a literal object (here illustrated as a document) from where it was derived for verification by a user of the merits of assertions made within the snip object or point object within which the snip object has been linked. The method begins at 1210 when the point management system responds to a user request to view a snip object in the context of a document by determining whether the user has access to the document reference by the snip object. At 1220 if the rights policy data governing the user's access to the document does not allow the user to access the literal object, then at 1230 a message is displayed to the user indicating they lack access to the document. If the rights policy allows user access to the document, then at 1240 the point management system responds by locating the document within the literal object database based on the literal ID referenced by the snip object. At 1250 the point management system then launches a document viewer for displaying the document. At 1260, the document viewer rotates the document to the page where the snip object was captured from as stored within the snip object. At 1270 the point management system visually displays an outline around the snip image based on the snip coordinates and dimensional information contained within the snip object. At 1280 the point management system visually displays the metadata for the snips associated with the document, and at 1290 draws a callout from the outline around the snip image to the snip metadata associated with that snip image.

Figure 13:
FIG. 13 illustrates a user interface of some embodiments for embedding a point widget within an activity stream.
Figure 13:

FIG. 13 shows an embodiment of point management system 100 as including a point widget 1310 embedded inside a host web page 1300. In FIG. 13, host web page 1300 is shown in the form of an activity stream. Host web page 1300 could be a blog page, wiki page, discussion forum page, web-based email thread, page hosted within a web application, corporate website or social network, or any other form of web page known in the art.

As shown in FIG. 1*a*, in some embodiments, point management system 100 may also include a snipping module 148 for creating snip objects from literal object stored in literal database 130. Snipping module 148 is communicatively coupled with user interface module 154 and literal database 130, enabling users of computing devices 172, 174 and 176 to upload literal objects into literal database 130 and to create snip objects from them. When a user selects a literal object for viewing and snipping through user interface module 154, snipping module 148 can generate snipping interface 1400 as shown in FIG. 14 and load literal the selected literal object.

Figure 14:
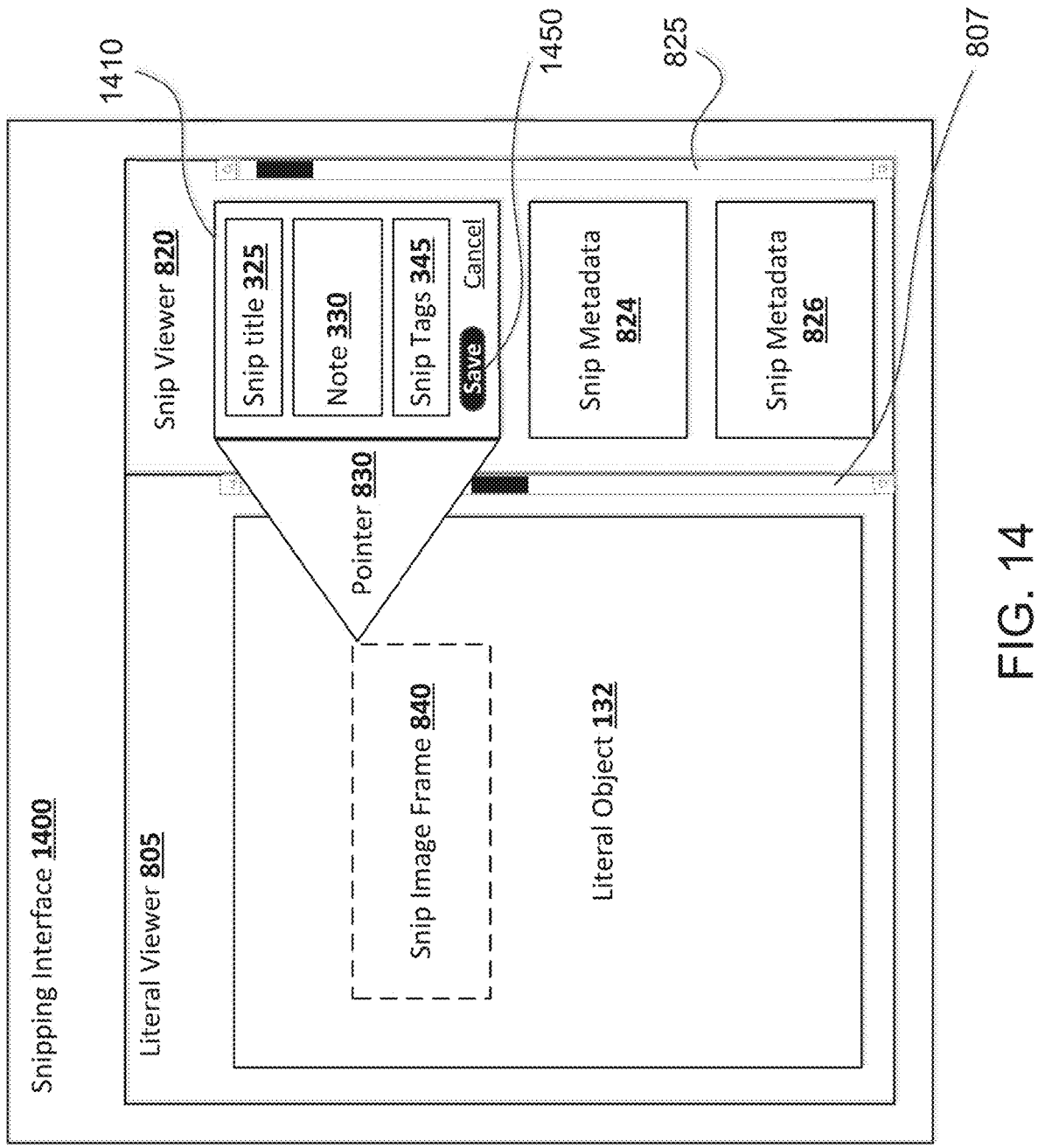
FIG. 14 illustrates an example snipping user interface of some embodiments.

As shown in FIG. 14, snipping interface 1400 includes a literal viewer 805 and snip viewer 820. Literal viewer 805 may comprise a document viewer, such as a web-based document viewer, a universal document viewer, a PDF viewer, an e-Book viewer, a web browser or any digital document viewer known in the art. Literal viewer 805 may also comprise a video player, audio player or image viewer. Literal viewer 805 is configured to load and display literal objects from the literal database 130 upon instruction from snipping module 148.

Snipping interface 1400 further includes a snip viewer 820. Snip viewer 820 is configured to display snip metadata associated with literal objects displayed in the literal viewer 805. For example, as shown in FIG. 14, snip metadata 824 and snip metadata 826 may represent various attributes of snip objects including snip titles 325, notes 330 and snip tags 345 that are associated snip objects snipped from literal object 132. Snip metadata could include other snip object attributes, including snip type 310, creator 350, snip comments 347 or any snip object attribute that comprises snip objects as shown in FIG. 3. FIG. 14 further illustrates a snip object input 1410 while the snip object is being created by a user. When a user positions snip image frame 840 over a page of literal object 132, snipping interface 1400 is configured to draw pointer 830 to visually display the relationship between snip metadata 822 and the snip image frame 840. Upon hitting save button 1450, the page number 410, top coordinate 415, left coordinate 415, width 425 and height 430 associated with the selected snip object are all saved in parts 365 within snip database 120. Prior to hitting save button 1450, the user may be prompted to input one or more items of snip metadata, including snip title 325, notes 330 and snip tags 345.

Snip objects may be created from documents, web pages, videos, audio files or other content stored within the literal database 130. A user may incorporate snip objects into a point object and then create points based on those snip objects (bottoms-up point-maker) as depicted in FIG. 6b, or create their points first and then add snips to a point object (top-down point-maker) as shown in FIG. 6a. Snip objects may be associated with point objects using any method known to those skilled in the art, including but not limited to drag-and-drop of snip objects, or typing the "@" or other symbol within a point-object field to trigger a query of a snip object database as shown in FIG. 6a.

In similar operation to literal user interface 800, when user selects a snip metadata 824 or 826, snipping module 148 instructs literal viewer 805 to display the page of literal object 132 corresponding to page number 410 in parts 365 associated with the corresponding snip object. Snipping module 148 further positions snip image frame 840 according to the top coordinate 415, left coordinate 415, width 425 and height 430 associated with the selected snip object. Snipping module 148 is further configure to draw pointer 830 to visually display the relationship between a selected snip and the snip image frame 840 which corresponds with that snip object. In operation, if the user then selected snip metadata 826, the process would repeat, literal viewer 805 would rotate to the page associated with the snip object referenced by snip metadata 826 and the snip image frame 840 would be positioned according to the snip object referenced by snip metadata 826.

The above description of snipping module 148 is just one implementation of a snipping module. Additional embodiments of snipping modules for creating snip objects are described in co-owned U.S. patent application 61/722,033 entitled "Collaboration Management Systems", filed Nov. 2, 2012 wherein snip objects are referred to as collaboration objects, and in co-owned U.S. patent application 61/788,106 entitled "Website Excerpt Validation and Management System", filed Mar. 15, 2013, wherein snip objects are referred to as document clip objects. Additionally, snip objects may be created using a snipping module interfaced with a reading application, as described in co-owned U.S. patent application 61/968,505 entitled "System and Method for Transmitting Organizational Knowledge To and From Reading Applications", filed Mar. 21, 2014.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A point management system, comprising a processor, and a non-transitory computer readable storage medium having instructions that, when executed by the processor, instantiate:

a literal database, programmed to store a plurality of literal objects;

a snip database programmed to store a plurality of snip objects, wherein each snip object in the plurality of snip objects comprises:

an excerpt of digital content from a literal object stored in the literal database;

at least one piece of snip metadata input by a user;

a snip location corresponding with the location of the excerpt of digital content within the literal object;

a point authoring module coupled with the snip database and programmed to:

provide a user interface configured to allow a user to generate a set of points;

generate a query in real-time based on key words according to user input;

submit the query to the snip database;

receive a result set of snip objects from the snip database that satisfy the query;

instantiate a point object based on the set of snips;

link the point object to at least one of the snip objects in the result set; and configure a device to store the point object; and a snip verification engine coupled with the snip database and the literal database, programmed to:

detect an interaction with the point object;

expand the point object to display at least one of the set of snip objects within the point object;

detect an interaction with a snip object from the at least one of the set of snip objects within the point object;

instantiate a literal viewer including the literal object associated with the snip object, by looking up the literal object within the literal database, wherein the literal viewer comprises:

at least one snip location; and at least one piece of snip metadata; and render the snip within the document according to the literal viewer.

2. The point management system of claim 1 wherein the literal object comprises a document.

3. The point management system of claim 2, wherein the snip location comprises a set of coordinates identifying a section of a document.

4. The point management system of claim 3, further comprising a metadata management system configured to resolve differences between the rights policies of point objects, snip objects and literal objects.

5. The point management system of claim 3 wherein user access to snip objects is governed by the rights policy data for literal objects referenced by the snip objects.

6. The point management system of claim 1, wherein the point metadata is classified as one of the following based on the annotation event: a fact, a point, a conclusion and a synthesis.

7. The point management system of claim 1 further comprising a snipping module that enables users to create snip objects and stores them in the snip object database.

8. The point management system of claim 1, wherein the snip objects returned from the query of the snip object database include snip objects created by users other than the author of the point object.

9. The point management system of claim 1, further comprising a point card widget configured for insertion within an activity stream.

* * * * *

UNITED STATES PATENT AND TRADEMARK OFFICE
CERTIFICATE OF CORRECTION

PATENT NO. : 10,592,560 B2
APPLICATION NO. : 15/704780
DATED : March 17, 2020
INVENTOR(S) : John Richard Burge et al.

Page 1 of 1

It is certified that error appears in the above-identified patent and that said Letters Patent is hereby corrected as shown below:

In the Claims

In Claim 1, at Column 20, Line 37 change "at least one piece of snip metadata input by a user;" to --at least one piece of snip metadata input by a user; and--

Signed and Sealed this
Third Day of November, 2020

Andrei Iancu
*Director of the United States Patent and Trademark Office*